(12) United States Patent
Hanley

(10) Patent No.: US 11,092,176 B2
(45) Date of Patent: *Aug. 17, 2021

(54) ROD BRACKET

(71) Applicant: Kenney Manufacturing Company, Warwick, RI (US)

(72) Inventor: Michael P. Hanley, Smithfield, RI (US)

(73) Assignee: Kenney Manufacturing Company, Warwick, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/820,402

(22) Filed: Mar. 16, 2020

(65) Prior Publication Data
US 2020/0217338 A1 Jul. 9, 2020

Related U.S. Application Data

(63) Continuation of application No. 16/018,979, filed on Jun. 26, 2018, now Pat. No. 10,648,492, which is a (Continued)

(51) Int. Cl.
*A47B 96/06* (2006.01)
*F16B 2/06* (2006.01)
(Continued)

(52) U.S. Cl.
CPC .............. *F16B 2/065* (2013.01); *A47H 1/142* (2013.01); *F16B 45/00* (2013.01)

(58) Field of Classification Search
CPC .......... F16M 13/00; A47H 1/10; A47H 1/122; A47G 1/12
See application file for complete search history.

(56) References Cited

U.S. PATENT DOCUMENTS 102,945 A     5/1870    Judd et al.
229,873 A     7/1880    Day
(Continued)

FOREIGN PATENT DOCUMENTS

EP     0219648 A1    4/1987
EP     0229497 A1    7/1987
(Continued)

OTHER PUBLICATIONS

Extended European Search Report issued in European Application No. 07742165.9, dated Jan. 4, 2017, 7 pages.
(Continued)

*Primary Examiner* — Amy J. Sterling
(74) *Attorney, Agent, or Firm* — Adler Pollock & Sheehan P.C.; Daniel J Holmander, Esq.

(57) ABSTRACT

A rod bracket is provided and includes a bracket base, wherein the bracket base defines a plurality of bracket mounting cavities and includes a base front, a base rear, a base top and a base bottom, a bracket arm having a bracket arm length and a curtain rod cradle securely associated with the bracket base via the bracket arm, wherein the plurality of bracket mounting cavities communicate the base front with the base rear and are configured at an angle of between about 30.degree. and 60.degree. relative to a horizontal plane, and wherein the bracket base defines a first bracket base rear opening, and wherein the ratio between the bracket arm length and the distance between the first bracket base rear opening and the base bottom is about 1:1.

20 Claims, 19 Drawing Sheets

Related U.S. Application Data continuation of application No. 15/488,781, filed on Apr. 17, 2017.

(60) Provisional application No. 62/384,895, filed on Sep. 8, 2016.

(51) Int. Cl.
*A47H 1/142* (2006.01)
*F16B 45/00* (2006.01)

(56) References Cited

U.S. PATENT DOCUMENTS

| | | |
|---|---|---|
| 232,644 A | 9/1880 | Judd |
| 374,340 A | 12/1887 | Brass |
| 378,087 A | 2/1888 | Field |
| D23,731 S | 10/1894 | Burgess |
| 762,733 A | 6/1904 | Malmquist |
| 769,859 A | 9/1904 | Fanning |
| 824,067 A | 6/1906 | Dennis |
| 827,272 A | 7/1906 | Tait |
| 827,627 A | 7/1906 | Graham |
| 917,601 A | 4/1909 | Heinrichs |
| 937,457 A | 10/1909 | Moffat |
| 965,658 A | 7/1910 | Reubel |
| 969,051 A | 8/1910 | Garraway et al. |
| 1,033,440 A | 7/1912 | Moffat |
| 1,049,355 A | 1/1913 | Haller |
| 1,057,043 A | 3/1913 | Dohm |
| 1,141,757 A | 6/1915 | Bitting |
| 1,147,355 A | 7/1915 | Zevin |
| 1,249,955 A | 12/1917 | Hendrickson et al. |
| 1,392,405 A | 10/1921 | Dougherty |
| D60,744 S | 3/1922 | Weyman |
| 1,529,335 A | 3/1925 | William et al. |
| D70,831 S | 8/1926 | Dlouhy |
| D75,598 S | 6/1928 | Priest |
| D76,096 S | 8/1928 | Vermillion |
| D76,097 S | 8/1928 | Vermillion |
| 1,794,700 A | 3/1931 | Mccaskey |
| 2,219,075 A | 10/1940 | Le Veau |
| 2,224,008 A | 12/1940 | Auslander |
| 2,261,505 A | 11/1941 | Schlesinger |
| 2,298,380 A | 10/1942 | Hood |
| 2,679,373 A | 5/1954 | Henley |
| 2,859,879 A | 11/1958 | Rogers et al. |
| 2,893,676 A | 7/1959 | Connors et al. |
| 2,908,471 A | 10/1959 | Hollansworth |
| 2,965,339 A | 12/1960 | Denton |
| 3,131,251 A | 4/1964 | Ryan |
| 3,506,135 A | 4/1970 | Klingaman |
| 3,596,861 A | 8/1971 | Baldini |
| 3,614,045 A | 10/1971 | Cegielski, Jr. |
| 3,669,395 A | 6/1972 | Gehrke |
| 3,733,043 A | 5/1973 | Binns |
| 3,848,843 A | 11/1974 | Levy |
| 3,861,631 A | 1/1975 | Shorin |
| 3,912,211 A | 10/1975 | Topf |
| 3,928,894 A | 12/1975 | Bury et al. |
| 3,991,963 A | 11/1976 | Solo |
| D244,668 S | 6/1977 | Tegner |
| 4,140,294 A | 2/1979 | Zwarts |
| 4,162,721 A | 7/1979 | Moriya |
| D256,864 S | 9/1980 | Mitts et al. |
| D259,241 S | 5/1981 | Lynch et al. |
| 4,322,050 A * | 3/1982 | Roach .............. A47H 1/122 248/222.51 |
| 4,325,528 A | 4/1982 | Martin |
| D265,285 S | 7/1982 | Englert, Jr. |
| 4,340,199 A | 7/1982 | Brock |
| 4,381,578 A | 5/1983 | Glejf |
| D279,450 S | 7/1985 | Chap |
| 4,555,432 A | 11/1985 | Bossons |
| D281,575 S | 12/1985 | Chap |
| 4,606,526 A | 8/1986 | Rabinowitz |
| D285,410 S | 9/1986 | Webber |
| 4,662,593 A | 5/1987 | Shames et al. |
| D290,224 S | 6/1987 | Skinner |
| D290,931 S | 7/1987 | Powell |
| 4,684,095 A | 8/1987 | Athey |
| 4,718,625 A | 1/1988 | Boda |
| 4,883,247 A | 11/1989 | Crandall |
| 4,898,409 A | 2/1990 | Carter |
| D307,539 S | 5/1990 | Goodman et al. |
| 4,979,713 A | 12/1990 | Bell |
| 5,000,411 A | 3/1991 | Primeau |
| D315,862 S | 4/1991 | Specker, Jr. |
| D316,031 S | 4/1991 | Goodman et al. |
| 5,011,030 A | 4/1991 | Alaurent |
| 5,018,697 A | 5/1991 | Treanor et al. |
| 5,069,412 A | 12/1991 | Jacob |
| D327,642 S | 7/1992 | Foubister |
| D329,372 S | 9/1992 | Wilms |
| 5,178,355 A | 1/1993 | Herzig |
| D346,950 S | 5/1994 | Dunn et al. |
| 5,351,842 A | 10/1994 | Remmers |
| 5,398,900 A | 3/1995 | Schober |
| 5,433,416 A | 7/1995 | Johnson |
| 5,480,120 A | 1/1996 | Bruner |
| 5,542,641 A | 8/1996 | Donovan |
| 5,549,407 A | 8/1996 | Levi et al. |
| D373,719 S | 9/1996 | Lin |
| 5,564,666 A | 10/1996 | Pfeil |
| 5,582,303 A | 12/1996 | Sloan |
| D389,035 S | 1/1998 | Smiley et al. |
| 5,876,147 A | 3/1999 | Longo |
| D411,737 S | 6/1999 | Vogt |
| 5,921,518 A | 7/1999 | Bernardi |
| 6,042,078 A | 3/2000 | Donovan |
| 6,216,889 B1 | 4/2001 | Chang |
| 6,302,614 B1 | 10/2001 | Tseng |
| D455,334 S | 4/2002 | Ivankovic |
| D459,978 S | 7/2002 | Hollinger |
| 6,439,520 B1 | 8/2002 | Johnson |
| 6,520,463 B1 | 2/2003 | Ouano |
| 6,629,680 B2 | 10/2003 | Weck et al. |
| 6,695,276 B2 | 2/2004 | Skorka |
| D495,589 S | 9/2004 | Goodman et al. |
| D511,088 S | 11/2005 | Chiu |
| D516,900 S | 3/2006 | Hoernig |
| D517,402 S | 3/2006 | Cairns |
| 7,128,124 B2 | 10/2006 | Bibby et al. |
| 7,198,088 B2 | 4/2007 | McMenamin et al. |
| D552,455 S | 10/2007 | Moore |
| 7,287,734 B2 | 10/2007 | Bell |
| D554,982 S | 11/2007 | Wenck |
| D557,595 S | 12/2007 | Ernst et al. |
| 7,370,839 B2 | 5/2008 | Putman |
| D572,574 S | 7/2008 | Lee |
| 7,431,067 B2 | 10/2008 | Nien |
| 7,497,028 B2 | 3/2009 | Nevers et al. |
| D591,143 S | 4/2009 | Ernst et al. |
| D605,931 S | 12/2009 | Piersant |
| D605,932 S | 12/2009 | Piersant |
| D608,620 S | 1/2010 | Morgenroth |
| 7,686,273 B2 | 3/2010 | Christodoulou |
| 7,699,278 B2 | 4/2010 | Goldstein |
| D622,578 S | 8/2010 | Kollman |
| 7,798,463 B2 | 9/2010 | Morgenroth |
| D632,951 S | 2/2011 | McGreevy et al. |
| 7,926,127 B2 | 4/2011 | Barrese |
| D649,025 S | 11/2011 | Gingery |
| 8,056,873 B1 | 11/2011 | Hanley et al. |
| 8,231,093 B2 | 7/2012 | Tran |
| D678,754 S | 3/2013 | Burr |
| 8,418,975 B1 | 4/2013 | Burr |
| 8,469,207 B2 | 6/2013 | Rowan et al. |
| 8,500,078 B2 | 8/2013 | Castellanos |
| D700,827 S | 3/2014 | Starck |
| 8,672,286 B2 | 3/2014 | Darré et al. |
| 8,678,068 B1 | 3/2014 | Hobart et al. |
| D707,535 S | 6/2014 | Burr |
| 8,740,171 B2 | 6/2014 | Crescenzo |
| 8,814,114 B2 | 8/2014 | Baines |

(56) References Cited

U.S. PATENT DOCUMENTS

| | | |
|---|---|---|
| 8,827,587 B2 | 9/2014 | Didehvar |
| D714,622 S | 10/2014 | Pan |
| D715,133 S | 10/2014 | Pan |
| D715,625 S | 10/2014 | Pan |
| D715,626 S | 10/2014 | Pan |
| 8,851,435 B1 | 10/2014 | Bastien et al. |
| 8,925,747 B1 | 1/2015 | Hanley |
| 8,960,456 B2 | 2/2015 | Didehvar |
| D742,726 S | 11/2015 | Glass et al. |
| D760,068 S | 6/2016 | Sehl |
| 9,388,837 B1 | 7/2016 | Hanley |
| D767,378 S | 9/2016 | Sehl |
| 9,609,974 B2 | 4/2017 | Mateer |
| 9,687,092 B2 * | 6/2017 | Cabanes ............. A47G 1/1606 |
| D808,779 S | 1/2018 | Shoenhair et al. |
| 10,047,787 B2 | 8/2018 | Cheng |
| 10,123,647 B1 | 11/2018 | Mustafa |
| 10,228,080 B2 | 3/2019 | Zvak |
| 10,322,690 B2 | 6/2019 | Wang |
| D858,259 S | 9/2019 | Hanley |
| D858,260 S | 9/2019 | Hanley |
| 10,542,835 B1 | 1/2020 | Suozzo |
| 10,624,474 B2 | 4/2020 | Taratuta |
| 10,648,492 B2 * | 5/2020 | Hanley ................. A47H 1/142 |
| 2002/0162925 A1 | 11/2002 | Song |
| 2005/0000716 A1 | 1/2005 | Halbert |
| 2006/0021722 A1 | 2/2006 | Nien |
| 2006/0054288 A1 | 3/2006 | Bibby et al. |
| 2006/0060314 A1 | 3/2006 | Battista |
| 2007/0090244 A1 | 4/2007 | Goldstein |
| 2007/0125923 A1 | 6/2007 | Wong et al. |
| 2007/0186384 A1 | 8/2007 | Broehl et al. |
| 2008/0164393 A1 | 7/2008 | Hung |
| 2008/0210827 A1 | 9/2008 | Samelson |
| 2009/0032659 A1 | 2/2009 | Goldstein |
| 2010/0038329 A1 | 2/2010 | Pan |
| 2011/0174948 A1 | 7/2011 | Ward et al. |
| 2011/0266404 A1 | 11/2011 | Hsu et al. |
| 2012/0024809 A1 | 2/2012 | Rowan et al. |
| 2012/0067837 A1 | 3/2012 | He et al. |
| 2012/0119046 A1 | 5/2012 | Hsu et al. |
| 2012/0152872 A1 | 6/2012 | Didehvar |
| 2012/0217362 A1 | 8/2012 | Affonso |
| 2012/0228446 A1 | 9/2012 | Mikovich |
| 2012/0261371 A1 | 10/2012 | Baines |
| 2012/0284914 A1 | 11/2012 | Bauer |
| 2013/0043357 A1 | 2/2013 | Mcleod |
| 2013/0082017 A1 | 4/2013 | Tang |
| 2013/0099080 A1 | 4/2013 | Baines |
| 2013/0292349 A1 | 11/2013 | Bucklew et al. |
| 2013/0341474 A1 | 12/2013 | Baines |
| 2014/0103170 A1 | 4/2014 | Zvak |
| 2014/0150313 A1 | 6/2014 | Stevens |
| 2014/0166603 A1 | 6/2014 | Baines |
| 2014/0231606 A1 | 8/2014 | Sobb |
| 2014/0306079 A1 | 10/2014 | Kuo |
| 2014/0374367 A1 | 12/2014 | Morel |
| 2015/0265086 A1 | 9/2015 | Hanley et al. |
| 2016/0113428 A1 | 4/2016 | Weaver |
| 2016/0242586 A1 | 8/2016 | Mateer |
| 2017/0071390 A1 | 3/2017 | Moss et al. |
| 2017/0079457 A1 | 3/2017 | Baines |
| 2017/0332818 A1 | 11/2017 | Jones |
| 2018/0064279 A1 | 3/2018 | Hanley |
| 2018/0098656 A1 | 4/2018 | Baines |
| 2018/0255952 A1 | 9/2018 | Sollers |
| 2018/0317672 A1 | 11/2018 | Taratuta |
| 2019/0374057 A1 | 12/2019 | Maclaren-Taylor |

FOREIGN PATENT DOCUMENTS

| | | |
|---|---|---|
| EP | 1619397 A1 | 1/2006 |
| EP | 1748196 A1 | 1/2007 |
| GB | 2289983 A | 12/1995 |
| JP | S629405 U | 1/1987 |
| JP | S6295483 A | 5/1987 |
| JP | H0784052 A | 3/1995 |
| JP | 2002207080 A | 7/2002 |
| JP | 2005257437 A | 9/2005 |
| WO | 9827443 A1 | 6/1998 |
| WO | 2009/039578 A1 | 4/2009 |

OTHER PUBLICATIONS

International Search Report and Written Opinion received in International Application No. PCT/JP2007/058730, dated Jul. 17, 2007, 11 pages( 6 pages of English Translation and 5 pages of Original Search Report).

* cited by examiner

Section A-A  FIG. 2

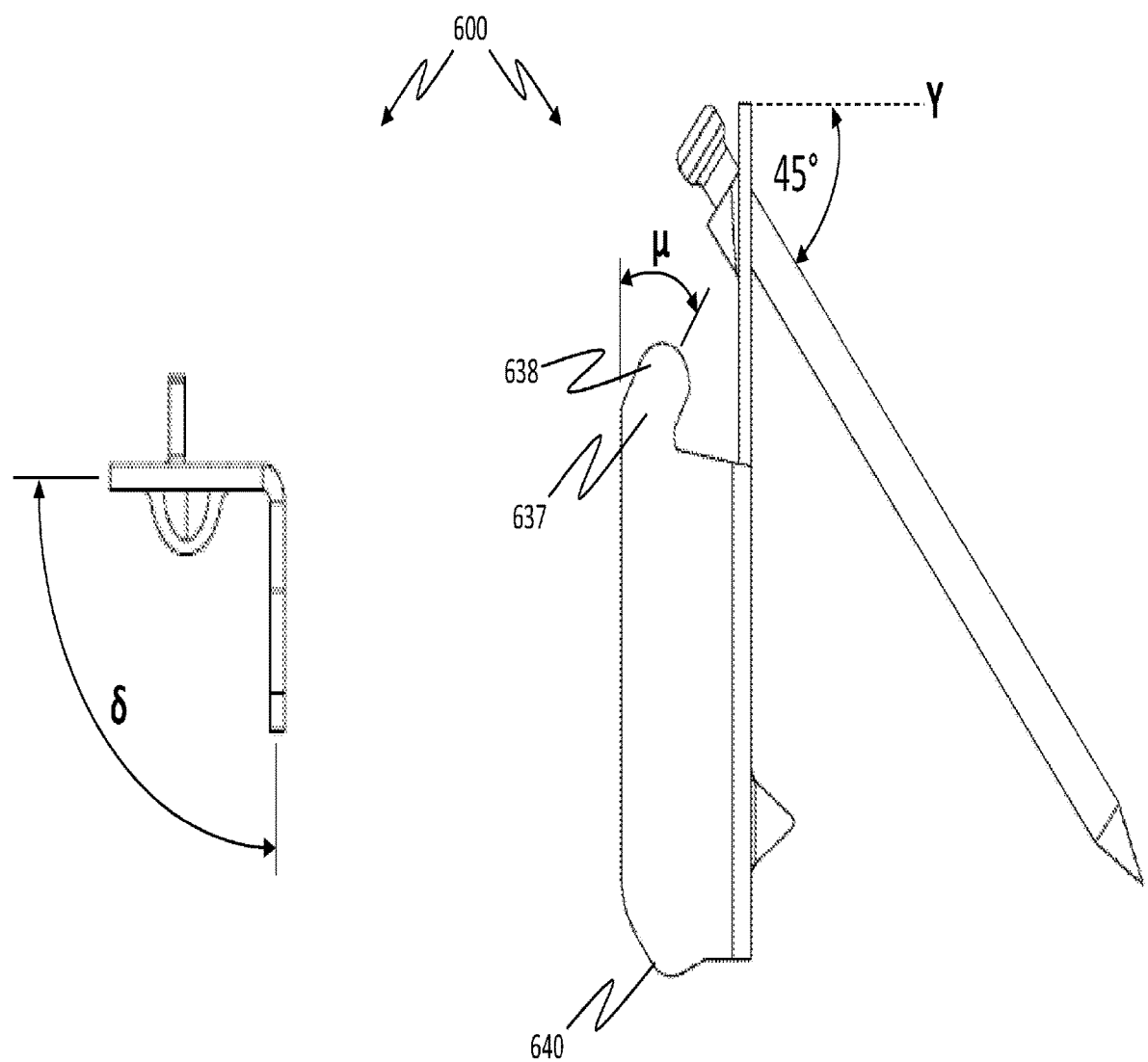
*FIG. 12D*  *FIG. 12E*

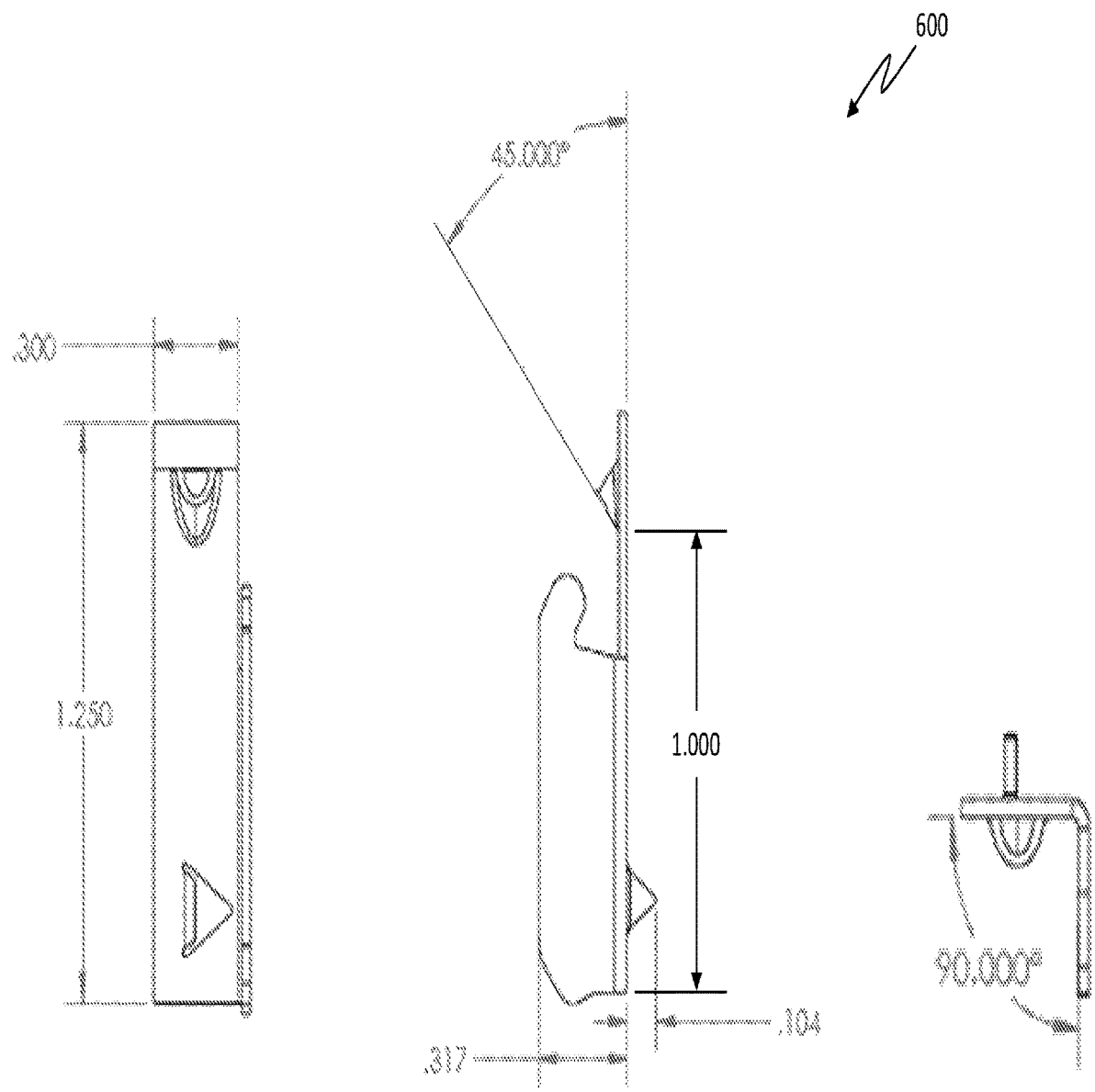
*FIG. 12G*  *FIG. 12H*  *FIG. 12I*

ROD BRACKET

CROSS REFERENCE TO RELATED APPLICATIONS

This application is a Continuation of U.S. patent application Ser. No. 16/018979, filed Jun. 26, 2018, which is a Continuation of U.S. patent application Ser. No. 15/488,781, filed Apr. 17, 2017, which is related to and claims the benefit of the filing date of U.S. Provisional Patent Application Ser. No. 62/384,895 filed Sep. 8, 2016, the contents of which are incorporated herein by reference in their entireties.

FIELD OF THE INVENTION

The present invention relates generally to rod brackets and more specifically to a rod bracket for hanging curtains and the like which is configured for easy install.

BACKGROUND OF THE INVENTION

Current curtain rod brackets that are mounted to walls and window casings typically require mounting hardware and preparation of the mounting area before mounting. This usually involves pre-drilling the wall surface and installing screw anchors to provide enough support to support the curtain rod brackets, the curtain rod and the curtains that are associated with the curtain rods. This can be a time consuming and messy process. And in some cases, for the person who is not adept at or who is not used to installing this type of hardware, can damage the wall and/or window casing. One way that has been attempted to overcome this problem is to develop curtain rod brackets that can be installed simply by associating the curtain rod brackets to the wall or window casing via friction and thus, curtain rod bracket that do not require tools to install. Unfortunately however, there are situations where these "tool less" curtain rod brackets cannot be used and thus, must be installed by anchoring the curtain rod bracket to the wall using tools.

SUMMARY OF THE INVENTION

A rod bracket is provided and includes a bracket base, wherein the bracket base defines a first bracket mounting cavity and a second bracket mounting cavity and includes a bracket front, a bracket rear, a bracket top and a bracket bottom. A bracket arm is also provided, wherein the bracket arm includes a first bracket arm end and a second bracket arm end and wherein the first bracket arm end is securely associated with the bracket front. Furthermore, a curtain rod cradle is provided and is securely associated with the second bracket arm end, wherein the bracket base further includes a first bracket side and a second bracket side and wherein the first bracket mounting cavity is located on the first bracket side and the second bracket mounting cavity is located on the second bracket side and wherein the first bracket mounting cavity and second bracket mounting cavity are configured at an angle between about 30.degree. and about 60.degree. relative to a horizontal plane.

A rod bracket is provided and includes a bracket base, wherein the bracket base defines a plurality of bracket mounting cavities and includes a bracket front, a bracket rear, a bracket top and a bracket bottom. Additionally, a bracket arm and a curtain rod cradle securely associated with the bracket base via the bracket arm is also included, wherein the plurality of bracket mounting cavities communicate the bracket front with the bracket rear and are configured at an angle of about 45.degree. relative to a horizontal plane.

A rod bracket is provided and includes a bracket base, wherein the bracket base defines a plurality of bracket mounting cavities and includes a base front, a base rear, a base top and a base bottom, a bracket arm having a bracket arm length and a curtain rod cradle securely associated with the bracket base via the bracket arm, wherein the plurality of bracket mounting cavities communicate the base front with the base rear and are configured at an angle of between about 30.degree. and 60.degree. relative to a horizontal plane, and wherein the bracket base defines a first bracket base rear opening, and wherein the ratio between the bracket arm length and the distance between the first bracket base rear opening and the base bottom is about 1:1.

BRIEF DESCRIPTION OF THE DRAWINGS

The foregoing and other features and advantages of the present invention will be more fully understood from the following detailed description of illustrative embodiments, taken in conjunction with the accompanying drawings in which like elements are numbered alike:

FIG. 12D is a top down view of the rod bracket of FIG. 12A.

FIG. 12E is a side view of the rod bracket of FIG. 12A.

FIG. 12G shows a front view of one embodiment of the rod bracket of FIG. 12A.

FIG. 12H shows a side view of the embodiment of the rod bracket of FIG. 12G.

FIG. 12I shows a top down view of the embodiment of the rod bracket of FIG. 12G.

DETAILED DESCRIPTION OF THE INVENTION

Figure 1:
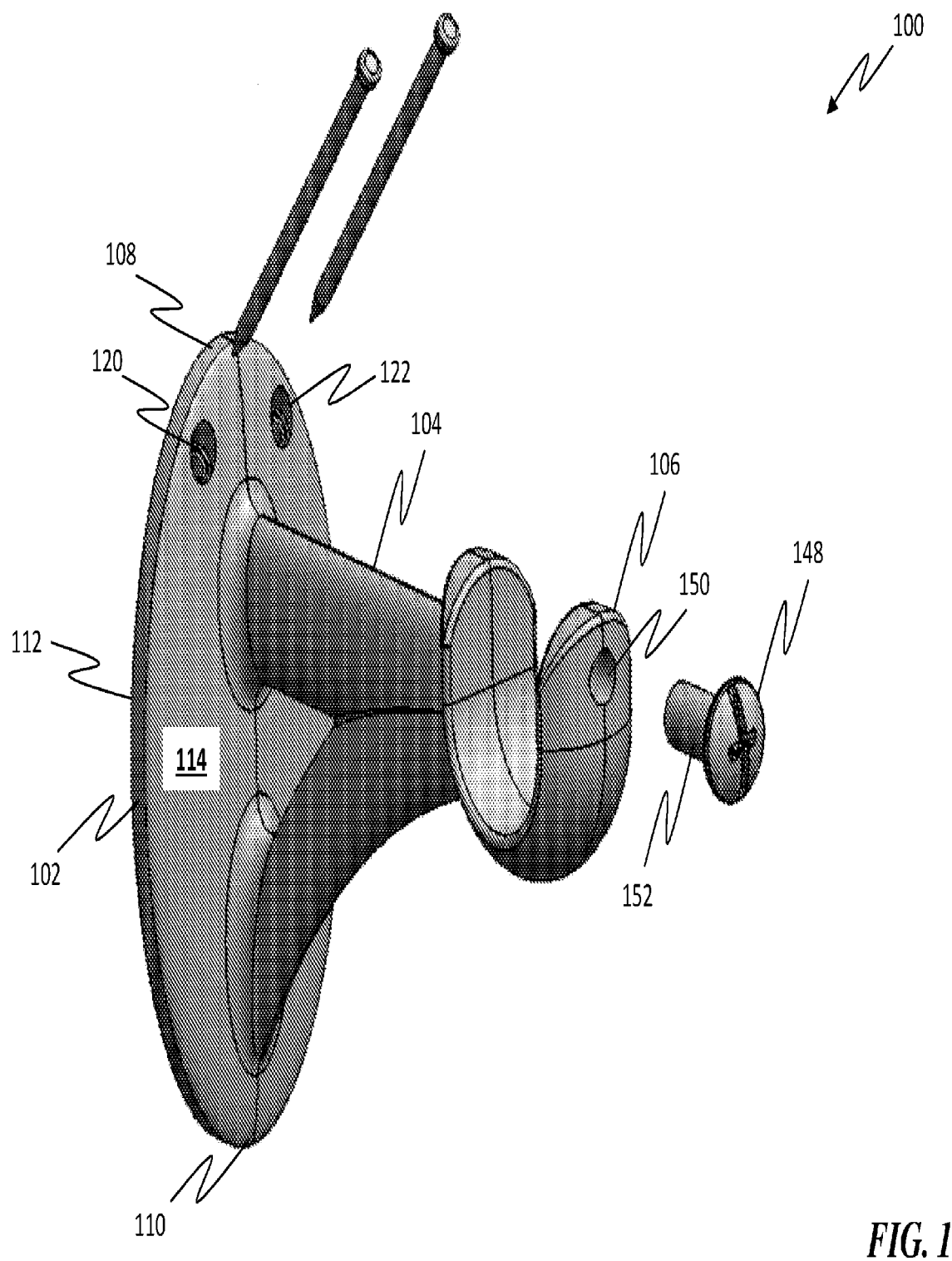
FIG. 1 is a side perspective view of a rod bracket, in accordance with one embodiment of the invention.
Figure 2:
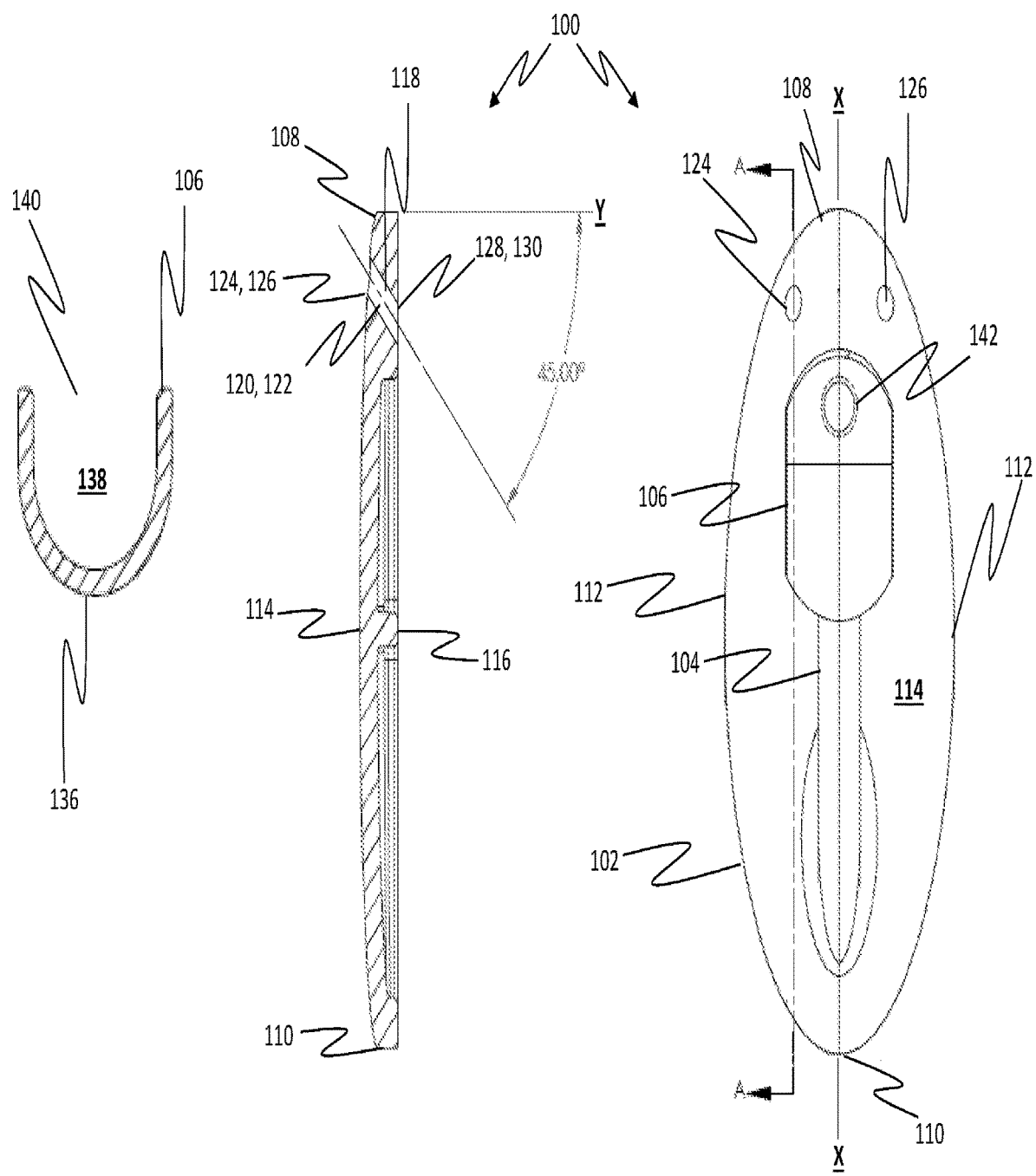
FIG. 2 is a front and side sectional view of the rod bracket of FIG. 1.
Figure 3:
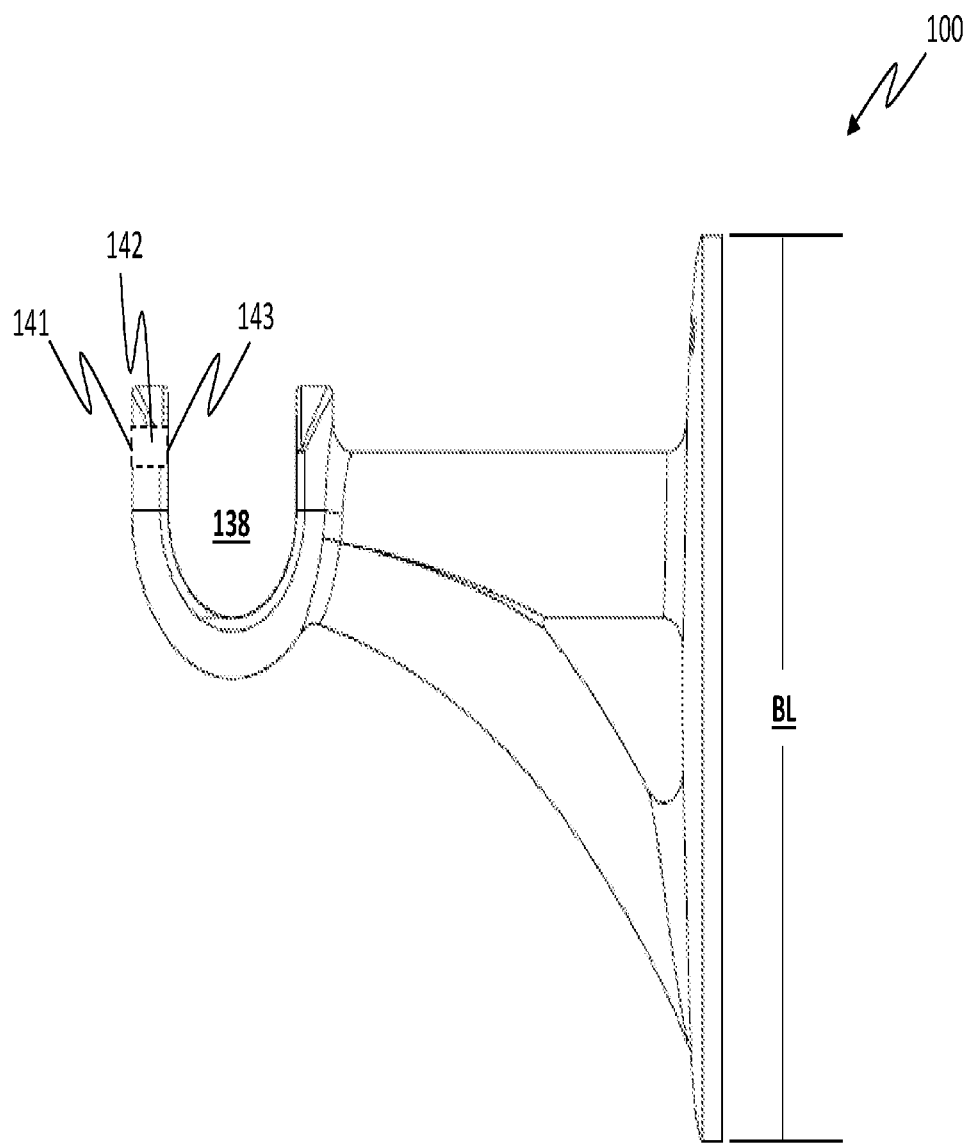
FIG. 3 is a side view of the rod bracket of FIG. 1.
Figure 4:
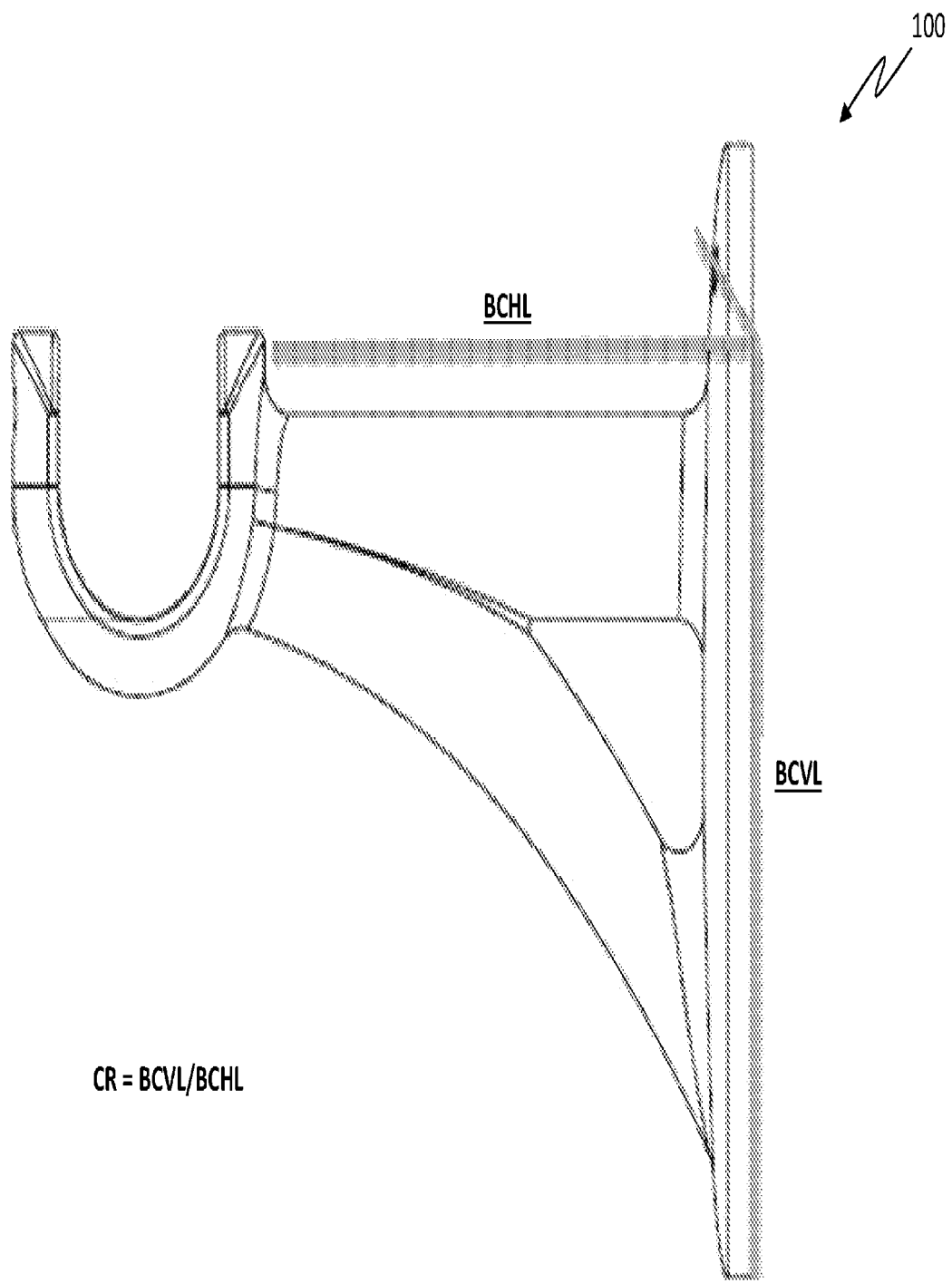
FIG. 4 is a side of the rod bracket of FIG. 1.

Referring to the FIG. 1, FIG. 2 and FIG. 3, one embodiment of a rod bracket 100 is provided and includes a bracket base 102, a bracket rod arm 104 and a curtain rod cradle 106, wherein the bracket base 102 is substantially oval in shape and includes a base top 108, a base bottom 110, base sides 112, a base front 114 and a base rear 116. The bracket base 102 defines a plurality of base mount cavities 118 located proximate the base top 108, wherein the plurality of base mount cavities 118 includes a first base mount cavity 120 and a second base mount cavity 122. It should be appreciated that the first base mount cavity 120 and second base mount cavity 122 are located such that if an imaginary axis line X were drawn through the center of the bracket base 102 from the base top 108 to the base bottom 110, the first base mount cavity 120 is located on one side of the imaginary axis line X and the second base mount cavity 122 is located equidistance on the other side of the imaginary axis line X.

The bracket base 102 defines a first bracket base front opening 124, a second bracket base front opening 126, a first bracket base rear opening 128 and a second bracket base rear opening 130, wherein the first bracket base front opening 124 is communicated with the first bracket base rear opening 128 via the first base mount cavity 120 and wherein the second bracket base front opening 126 is communicated with the second bracket base rear opening 130 via the second base mount cavity 122. It should be appreciated that the first base mount cavity 120 and second base mount cavity 122 are configured to traverse the width of the bracket base 102 at an angle of about 45.degree. relative to a horizontal plane Y. It should be appreciated that the bracket base 102 includes a base length BL which extends between the base top 108 and the base bottom 110. Additionally, the bracket base 102 includes a bracket clearance vertical length BCVL which extends from the first bracket base rear opening 128 and second bracket base rear opening 130 to the base bottom 110.

The bracket rod arm 104 includes an arm cradle end 132 and an arm base end 134 and is securely connected to (or integral with) the bracket base 102, wherein the bracket rod arm 104 is configured to extend out of and away from the base front 114. The bracket rod arm 104 also includes a bracket clearance horizontal length BCHL which extends between the arm cradle end 132 and the base rear 116. It is contemplated that in one embodiment there is a one-to-one (1:1) clearance ratio CR between the bracket clearance horizontal length BCHL and the bracket clearance vertical length BCVL. It should be appreciated that the clearance ratio CR may be increased by increasing the bracket clearance vertical length BCVL. This would advantageously allow for the rod bracket to support heavier loads than the 1:1 clearance ratio CR.

The curtain rod cradle 106 includes a cradle structure 136 which defines a rod cavity 138 and a cradle opening 140, wherein the cradle opening 140 is communicated with the rod cavity 138 and wherein the rod cavity is sized and shape to at least partially contain a curtain rod. The curtain rod cradle 106 is securely attached (or integral with) to the arm cradle end 132 of the bracket rod arm 104. The cradle structure 136 further defines a cradle mounting cavity 142 having a cradle mounting cavity first opening 141 and a cradle mounting cavity second opening 143, wherein the cradle mounting cavity first opening 141 is communicated with the cradle mounting cavity second opening 143 via the cradle mounting cavity 142. It should be appreciated that the cradle mounting cavity second opening 143 is located so as to be within the rod cavity 138. Additionally, the cradle mounting cavity 142 includes a threaded cavity surface 150 such that when a rod mounting screw 148 having a threaded screw surface 152 is inserted into the cradle mounting cavity first opening and rotated, the threaded screw surface 152 and the threaded cavity surface 150 engage each other. As such, the rod mounting screw 148 is securely contained within the cradle mounting cavity 142 such that a portion of the rod mounting screw 148 is protruding from the cradle mounting cavity second opening.

Figure 5:
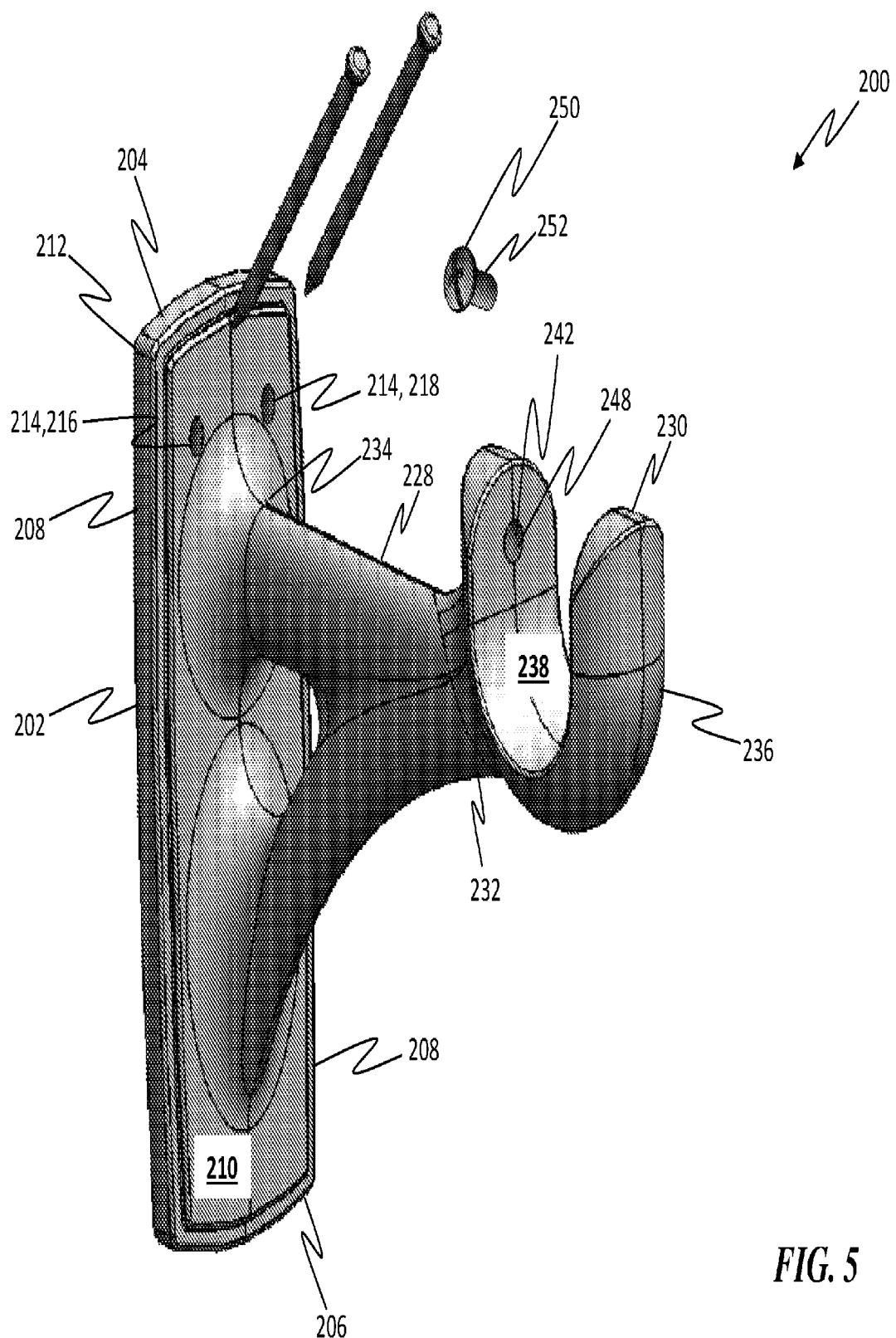
FIG. 5 is a side perspective view of a rod bracket, in accordance with another embodiment of the invention.
Figure 6:
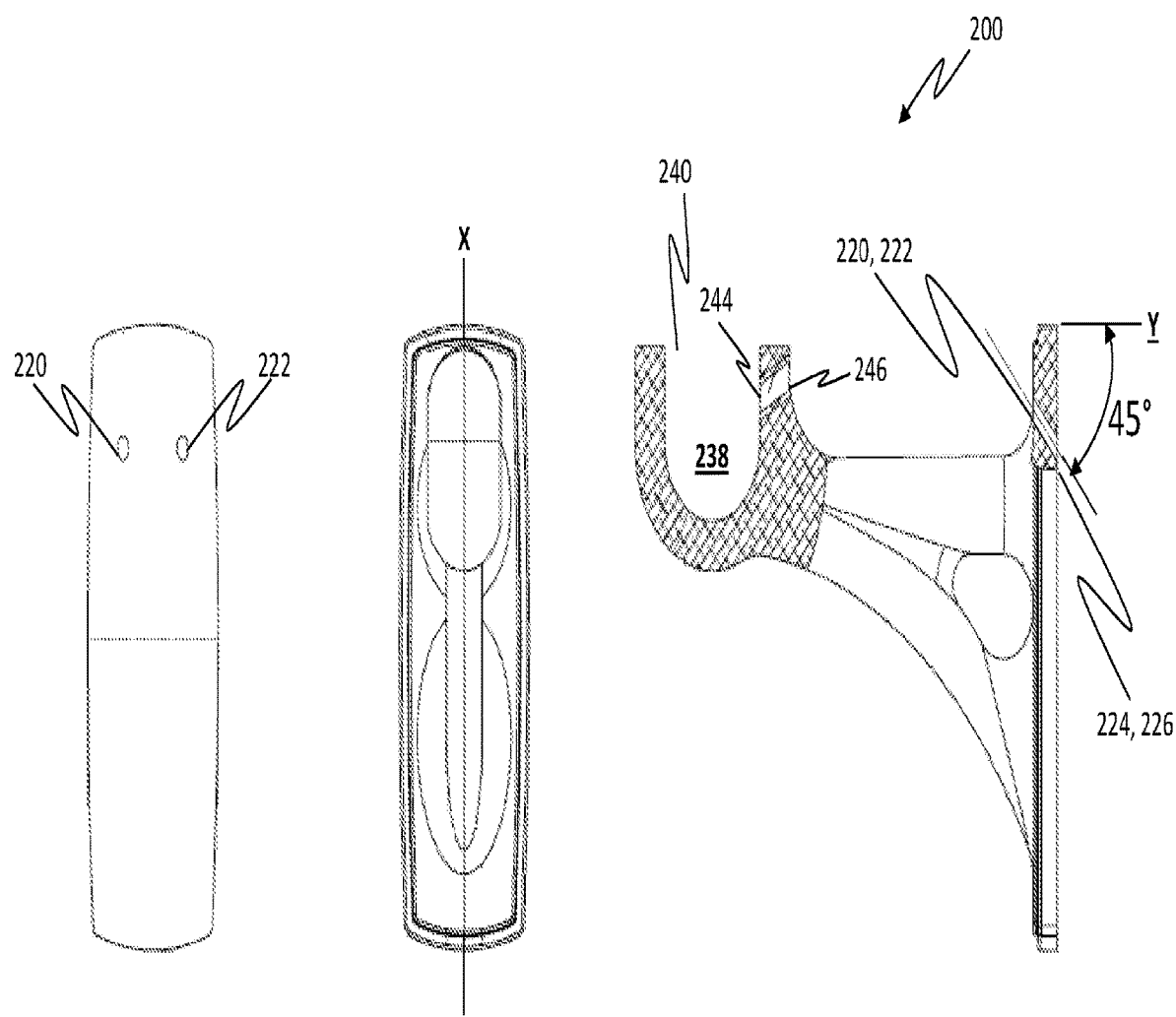
FIG. 6 is a front and side sectional view of the rod bracket of FIG. 5.
Figure 7:
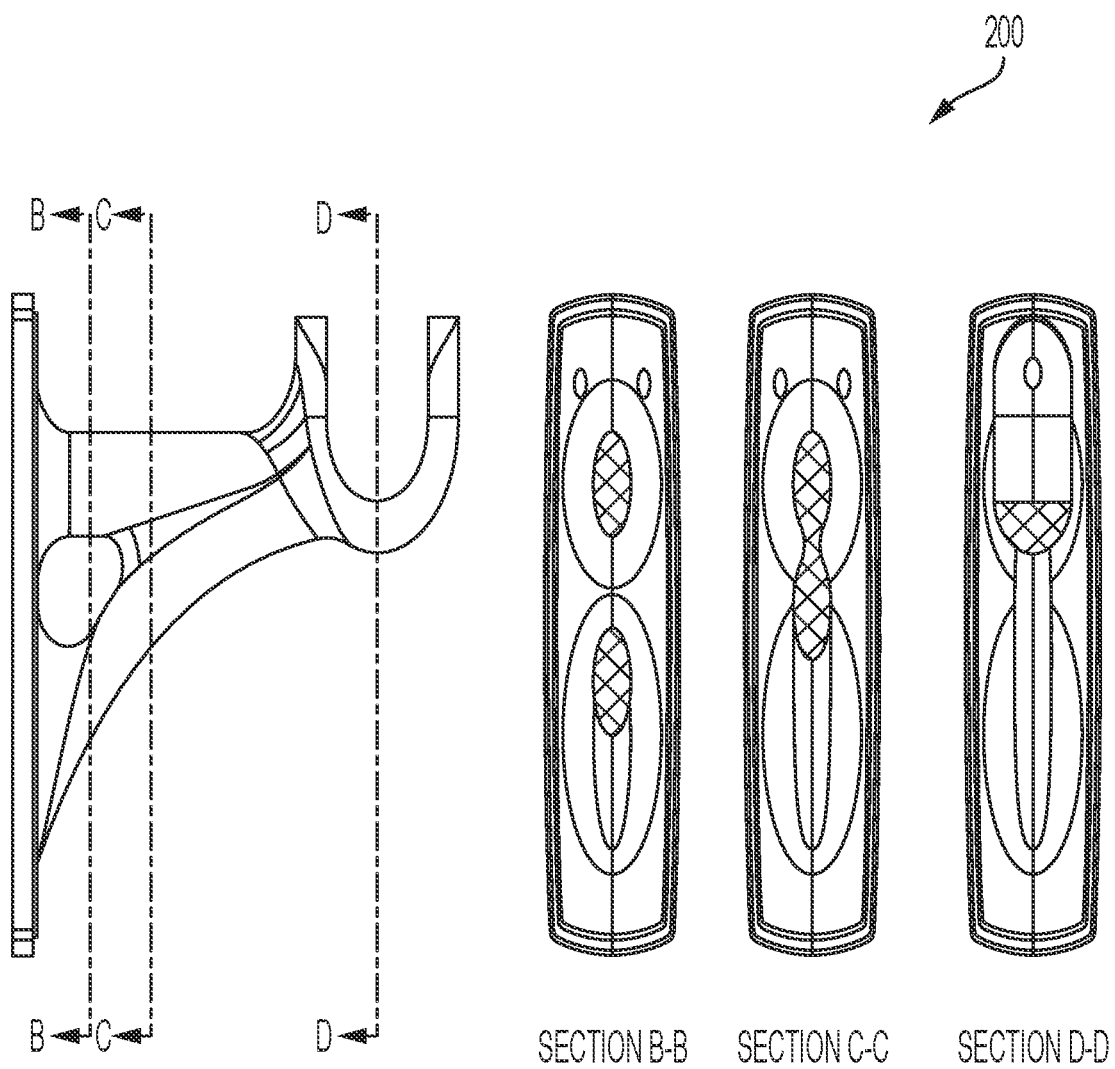
FIG. 7 is a front and side sectional view of the rod bracket of FIG. 5.
Figure 8:
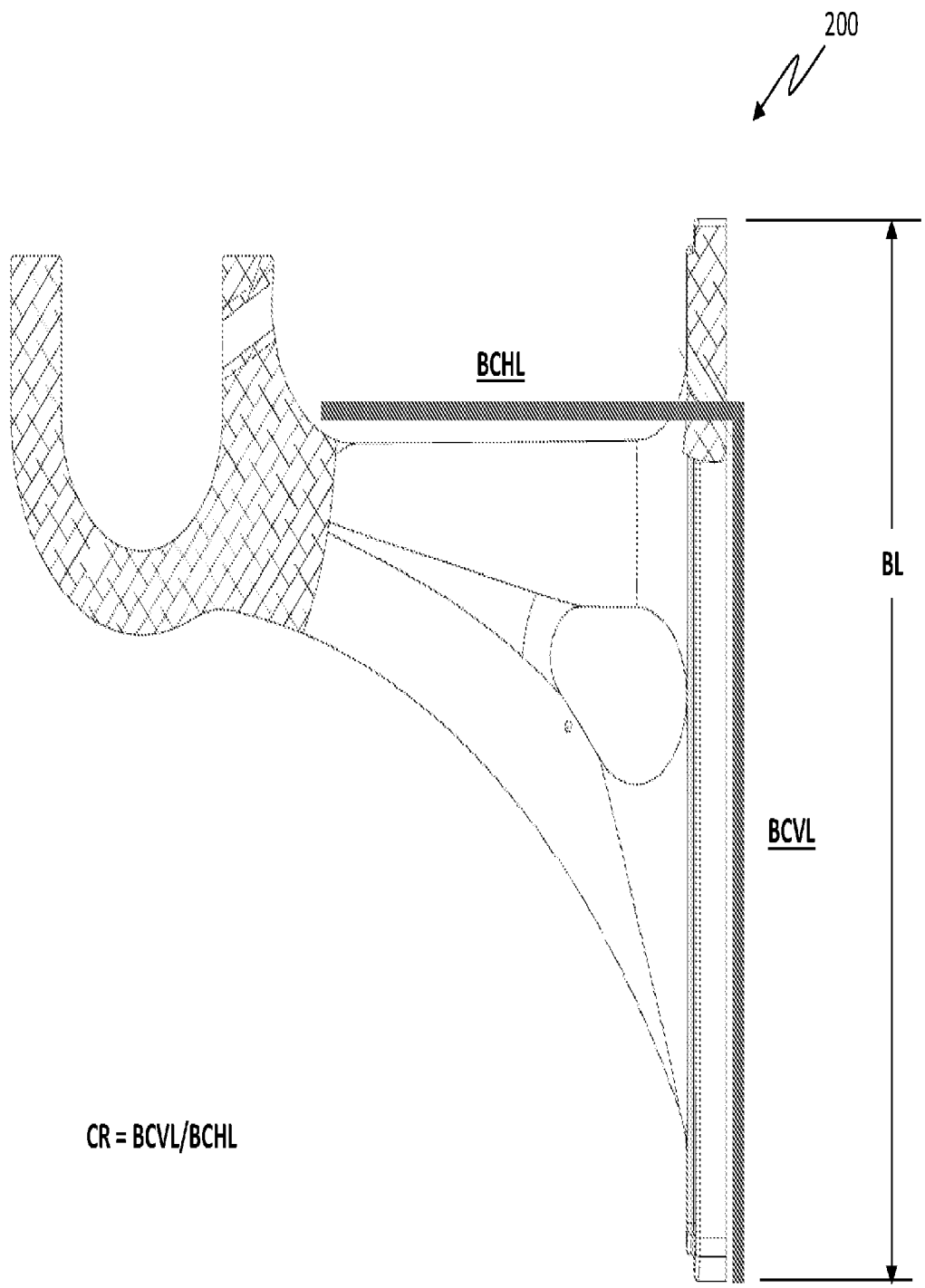
FIG. 8 is a side of the rod bracket of FIG. 5.

It should be appreciated that the bracket base 102 may be configured to have different shapes as desired, such as, for example, rectangular, triangular and square. Referring to FIG. 5, FIG. 6 and FIG. 7, another embodiment of a rod bracket 200 is provided and includes a bracket base 202 that is rectangular in shape. The bracket base 202 includes a base top 204, a base bottom 206, base sides 208, a base front 210 and a base rear 212. The bracket base 202 defines a plurality of base mount cavities 214 located proximate the base top 204, wherein the plurality of base mount cavities 214 includes a first base mount cavity 216 and a second base mount cavity 218. It should be appreciated that the first base mount cavity 216 and second base mount cavity 218 are located such that if an imaginary axis line X were drawn through the center of the bracket base 202 from the base top 204 to the base bottom 206, the first base mount cavity 216 is located on one side of the imaginary axis line X and the second base mount cavity 218 is located equidistance on the other side of the imaginary axis line X.

The bracket base 202 defines a first bracket base front opening 220, a second bracket base front opening 222, a first bracket base rear opening 224 and a second bracket base rear opening 226, wherein the first bracket base front opening 220 is communicated with the first bracket base rear opening 224 via the first base mount cavity 216 and wherein the second bracket base front opening 222 is communicated with the second bracket base rear opening 226 via the second base mount cavity 218. It should be appreciated that the first base mount cavity 216 and second base mount cavity 218 are configured to traverse the width of the bracket base 202 at an angle of about 45.degree. relative to a horizontal plane Y. It should be appreciated that the bracket base 202 includes a base length BL which extends between the base top 204 and the base bottom 206. Additionally, the bracket base 202 includes a bracket clearance vertical length BCVL which extends from the first bracket base rear opening 224 and second bracket base rear opening 226 to the base bottom 206.

The rod bracket 200 further includes a bracket rod arm 228 and a curtain rod cradle 230, wherein the bracket rod arm 228 includes an arm cradle end 232 and an arm base end 234 and is securely connected to (or integral with) the bracket base 202. The bracket rod arm 228 is configured to extend out of and away from the base front 210. The bracket rod arm 228 also includes a bracket clearance horizontal length BCHL which extends between the arm cradle end 232 and the base rear 212. It is contemplated that in one embodiment there is a one-to-one (1:1) clearance ratio CR between the bracket clearance horizontal length BCHL and the bracket clearance vertical length BCVL. It should be appreciated that the clearance ratio CR may be increased by increasing the bracket clearance vertical length BCVL. This would advantageously allow for the rod bracket to support heavier loads than the 1:1 clearance ratio CR.

The curtain rod cradle 230 includes a cradle structure 236 which defines a rod cavity 238 and a cradle opening 240, wherein the cradle opening 240 is communicated with the rod cavity 238 and wherein the rod cavity 238 is sized and shape to at least partially contain a curtain rod. The curtain rod cradle 230 is securely attached to (or integral with) the arm cradle end 232 of the bracket rod arm 228. The cradle structure 236 further defines a cradle mounting cavity 242 having a cradle mounting cavity first opening 244 and a cradle mounting cavity second opening 246, wherein the cradle mounting cavity first opening 244 is communicated with the cradle mounting cavity second opening 246 via the cradle mounting cavity 242. It should be appreciated that the cradle mounting cavity second opening 246 is located so as to be within the rod cavity 238. Additionally, the cradle mounting cavity 242 includes a threaded cavity surface 248 such that when a rod mounting screw 250 having a threaded screw surface 252 is inserted into the cradle mounting cavity first opening 244 and rotated, the threaded screw surface 252 and the threaded cavity surface 248 engage each other. As such, the rod mounting screw 250 is securely contained within the cradle mounting cavity 242 such that a portion of the rod mounting screw 250 is protruding from the cradle mounting cavity second opening 246.

Figure 9A:
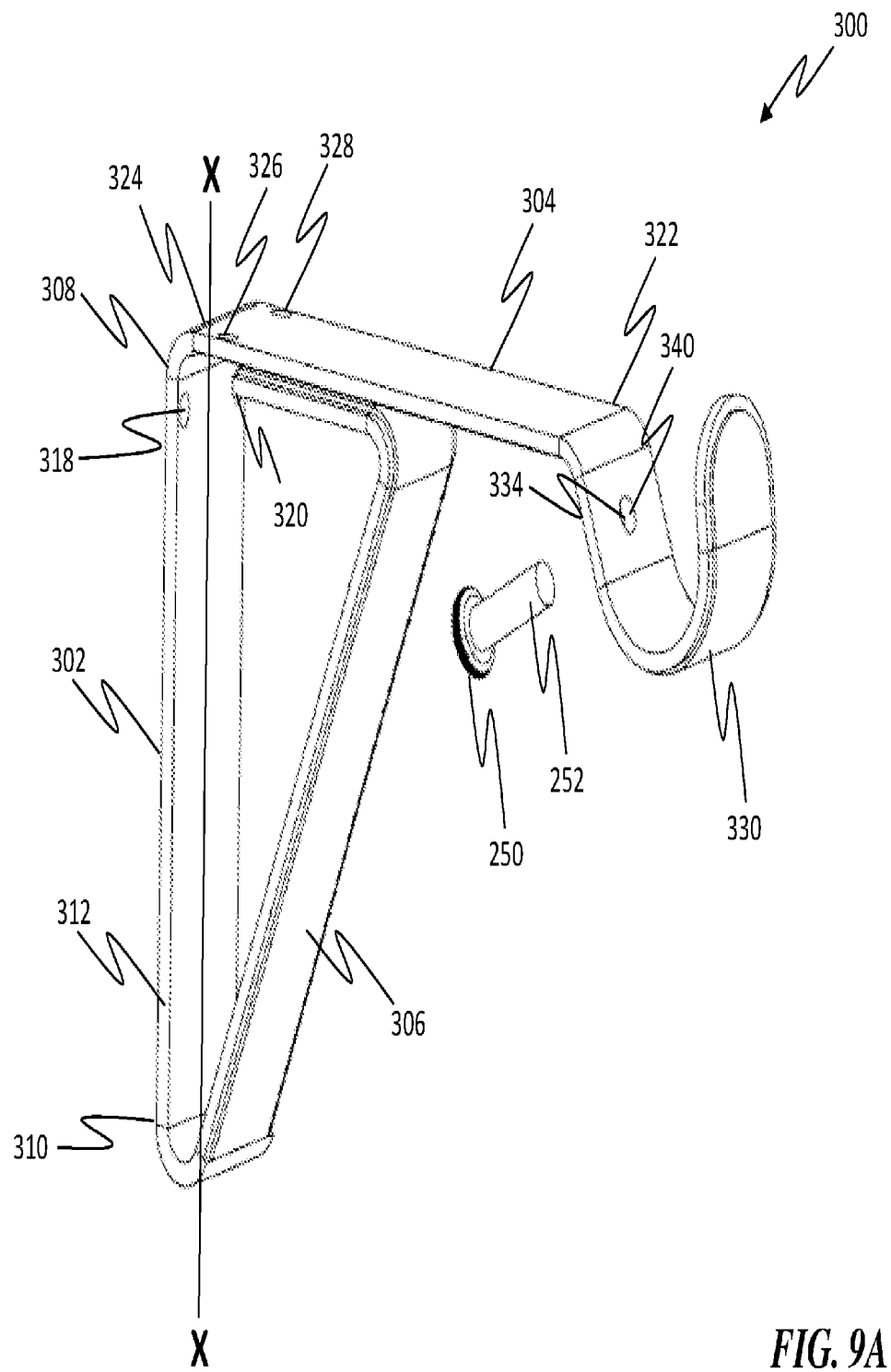
FIG. 9A is a front side view of a rod bracket, in accordance with still yet another embodiment of the invention.
Figure 9B:
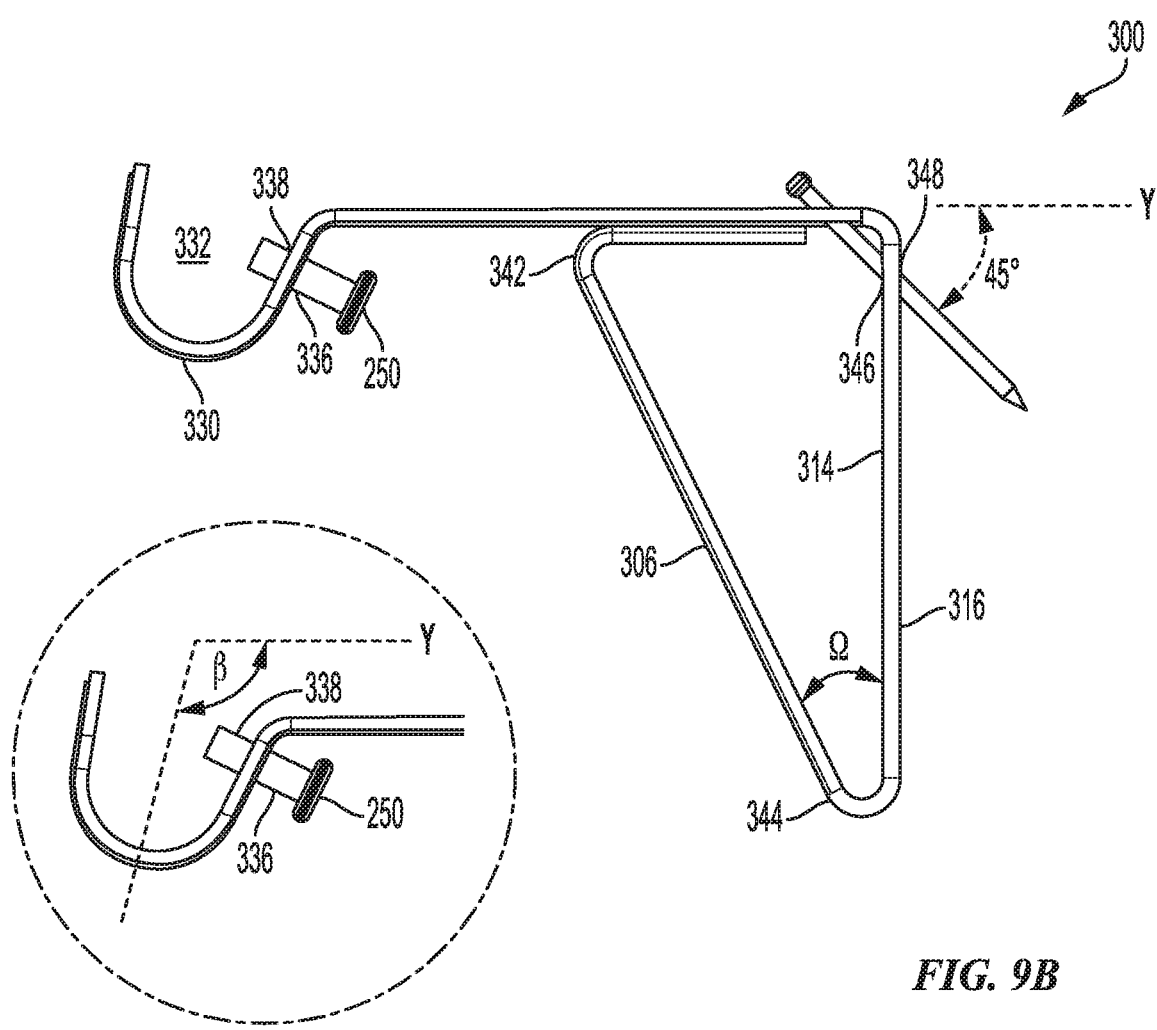
FIG. 9B is a side view of the rod bracket of FIG. 9A.
Figure 9C:
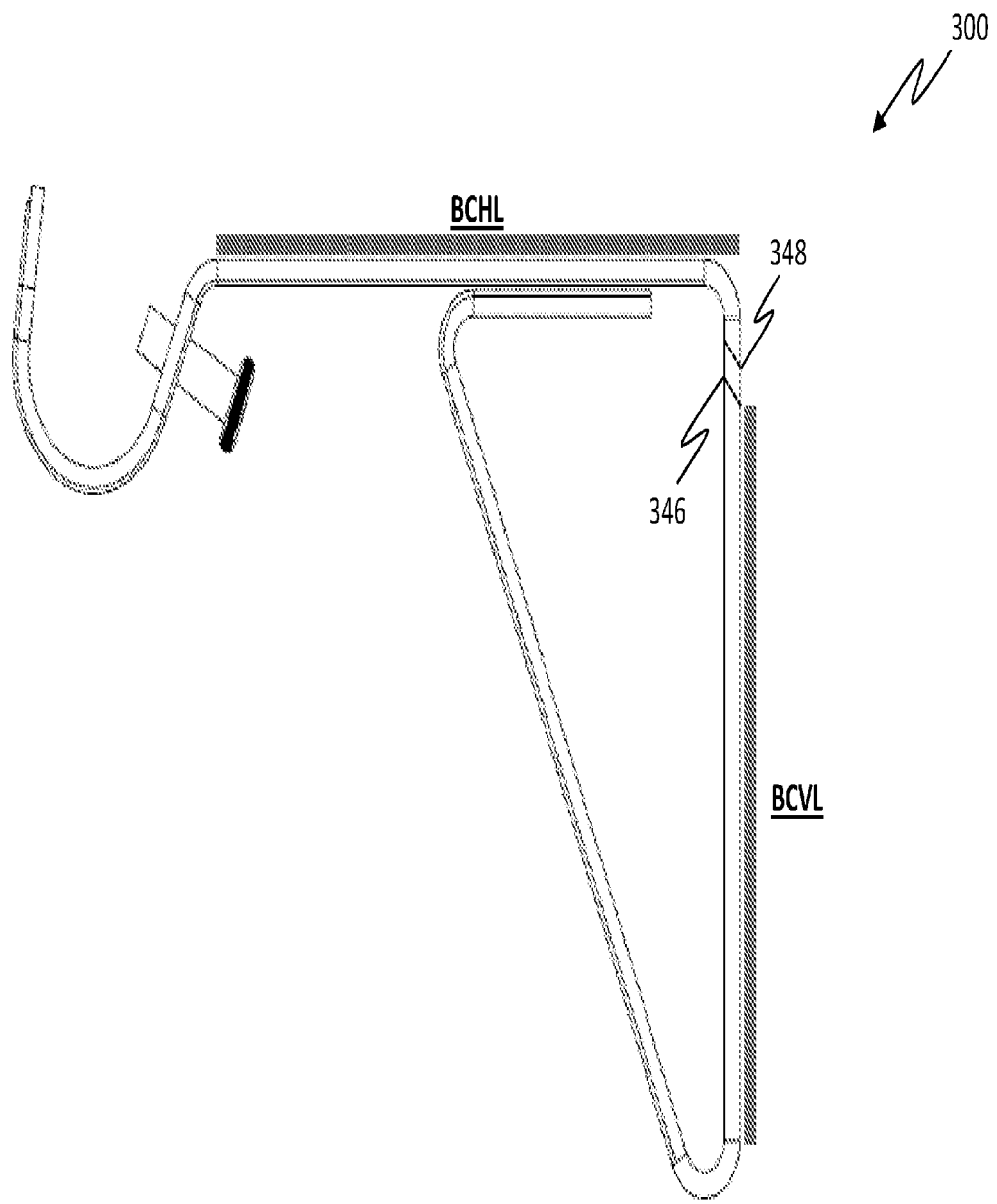
FIG. 9C is a side view of the rod bracket of FIG. 9A.

Referring to FIG. 9A, FIG. 9B and FIG. 9C, another embodiment of a rod bracket 300 is shown and includes a bracket base 302, a bracket rod arm 304 and a bracket support arm 306. The bracket base 302 includes a base top 308, a base bottom 310, base sides 312, a base front 314 and a base rear 316. The bracket base 302 defines a first base mount cavity 318 and a second base mount cavity 320 located proximate the base top 308. The first base mount cavity 318 and the second base mount cavity 320 are located such that if an imaginary axis line X were drawn down the center of the bracket base 302 from the base top 308 to the base bottom 310, the first base mount cavity 318 is located on one side of the imaginary axis line X and the second base mount cavity 320 is located equidistance on the other side of the imaginary axis line X.

The bracket rod arm 304 includes an arm cradle end 322, an arm base end 324, a first rod arm cavity 326 and a second rod arm cavity 328, wherein the first rod arm cavity 326 and second rod arm cavity 328 are located proximate the arm base end 324. It should be appreciated that the first base mount cavity 318 is aligned with the first rod arm cavity 326 such that when the bracket base 302 is placed against a surface and a nail or screw is passed through the first base mount cavity 318 and the first rod arm cavity 326, the nail or screw will enter the surface at an angle of about 45.degree. relative to a horizontal plane Y. It should be appreciated that the rod bracket 300 includes a curtain rod cradle 330 located proximate the arm cradle end 322, wherein the curtain rod cradle 330 defines a rod cavity 332 and a cradle mounting cavity 334 having a cradle mounting cavity first opening 336 and a cradle mounting cavity second opening 338, wherein the cradle mounting cavity first opening 336 is communicated with the cradle mounting cavity second opening 338 via the cradle mounting cavity 334.

It should also be appreciated that the cradle mounting cavity second opening 338 is located so as to be within the rod cavity 332. Additionally, the cradle mounting cavity 334 includes a threaded cavity surface 340 such that when a rod mounting screw 250 having a threaded screw surface 252 is inserted into the cradle mounting cavity first opening 336 and rotated, the threaded screw surface 252 and the threaded cavity surface 340 engage each other. As such, the rod mounting screw 250 is securely contained within the cradle mounting cavity 334 such that a portion of the rod mounting screw 250 is protruding from the cradle mounting cavity second opening 338. It should be appreciated that the curtain rod cradle 330 may be angled at an angle .beta. relative a horizontal plane Y, wherein .beta. may range from about 90.degree. to about 135.degree.

Furthermore, the bracket support arm 306 includes a support arm top 342 and a support arm bottom 344, wherein the support arm top 342 is associated with the bracket rod arm 304 and the support arm bottom 344 is connected to the base bottom 310 such that the bracket support arm 306 is angled at an angle .OMEGA. relative to the bracket base 302, wherein .OMEGA. may range from about 10.degree. to about 45.degree. It should be appreciated that the support arm top 342 may be connected to the bracket rod arm 304 or the support arm top 342 may be associated with the bracket rod arm 304 such that a portion of the bracket rod arm 304 rest upon and may be partially supported by the bracket support arm 306 when a rod is located within the rod cavity 332.

Referring to FIG. 9C, It should be appreciated that the first and second base mounting cavities 318, 320 include a front opening 346 located on the base front 314 and a rear opening 348 located on the base rear 316. Also, the bracket base 302 includes a bracket clearance vertical length BCVL which extends from the rear opening 348 to the base bottom 310 and the bracket rod arm 304 includes a bracket clearance horizontal length BCHL which extends between the arm cradle end 324 and the base rear 316. It is contemplated that in one embodiment there is a one-to-one (1:1) clearance ratio CR between the bracket clearance horizontal length BCHL and the bracket clearance vertical length BCVL and in other embodiments the CR may be greater or lesser than a one-to-one (1:1) ratio. It should be appreciated that the clearance ratio CR may be increased by increasing the bracket clearance vertical length BCVL which would advantageously allow for the rod bracket to support heavier loads than the 1:1 clearance ratio CR.

Figure 10A:
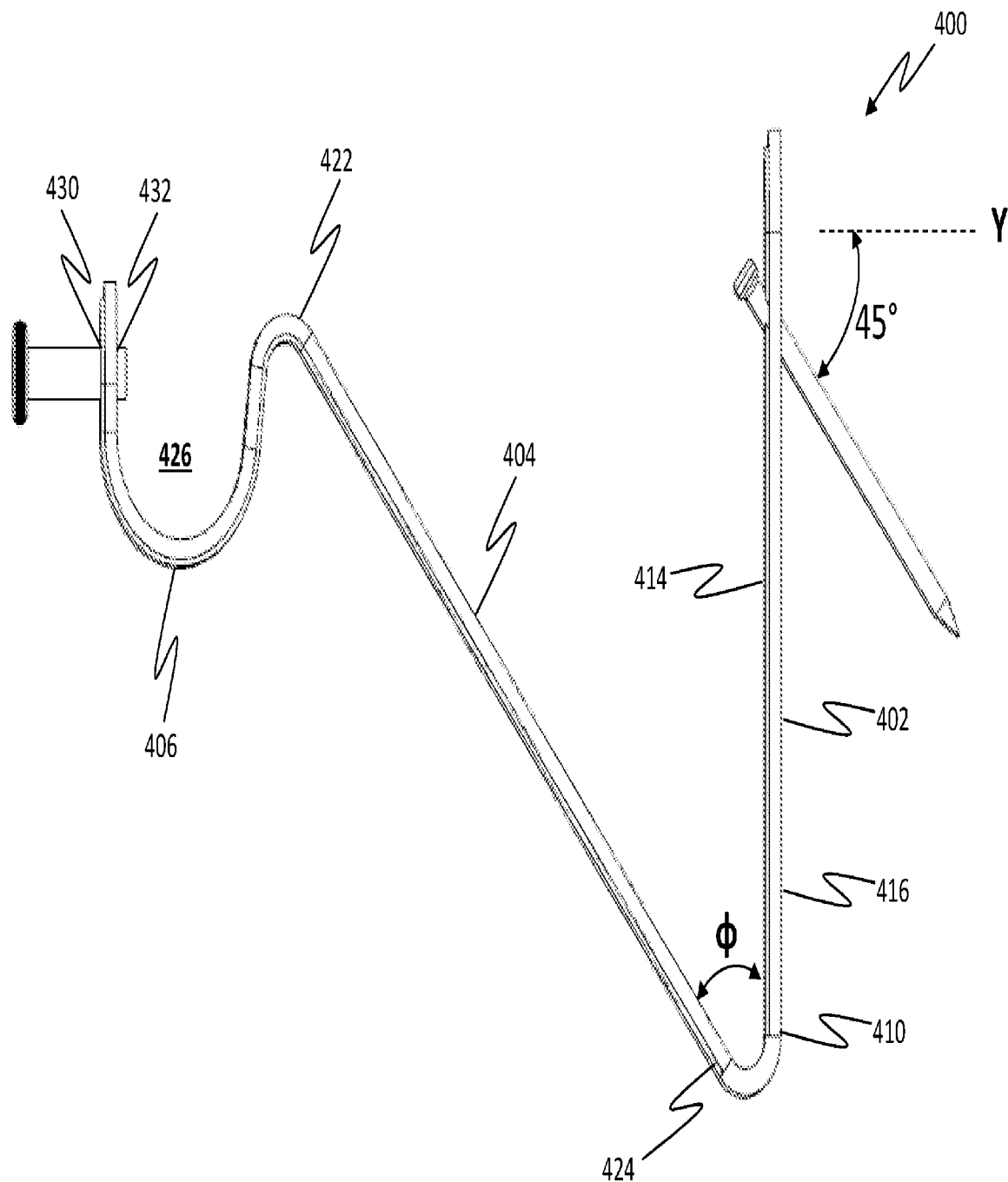
FIG. 10A is a side view of a rod bracket, in accordance with still yet another embodiment of the invention.
Figure 10B:
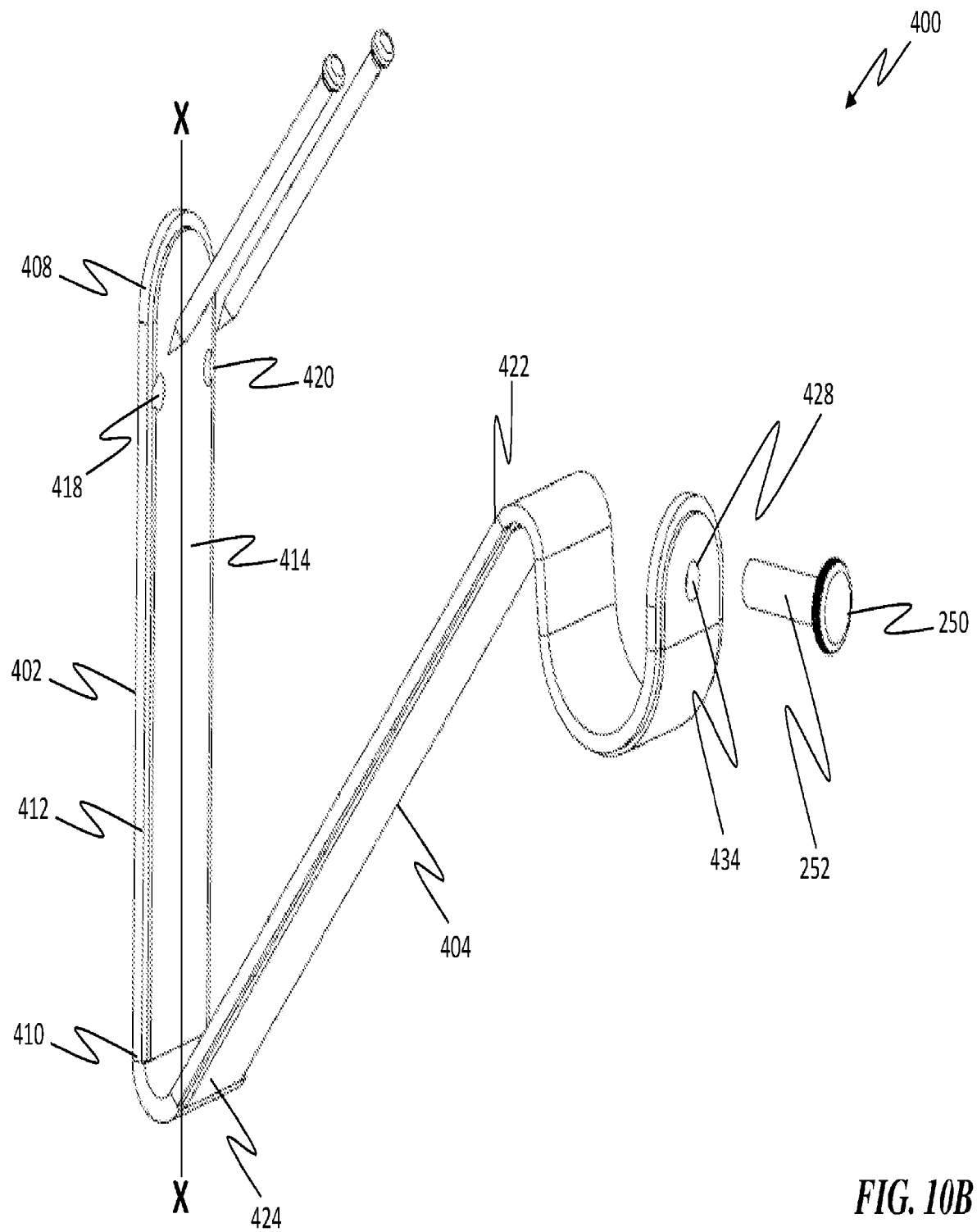
FIG. 10B is a front side view of the rod bracket of FIG. 10A.
Figure 10C:
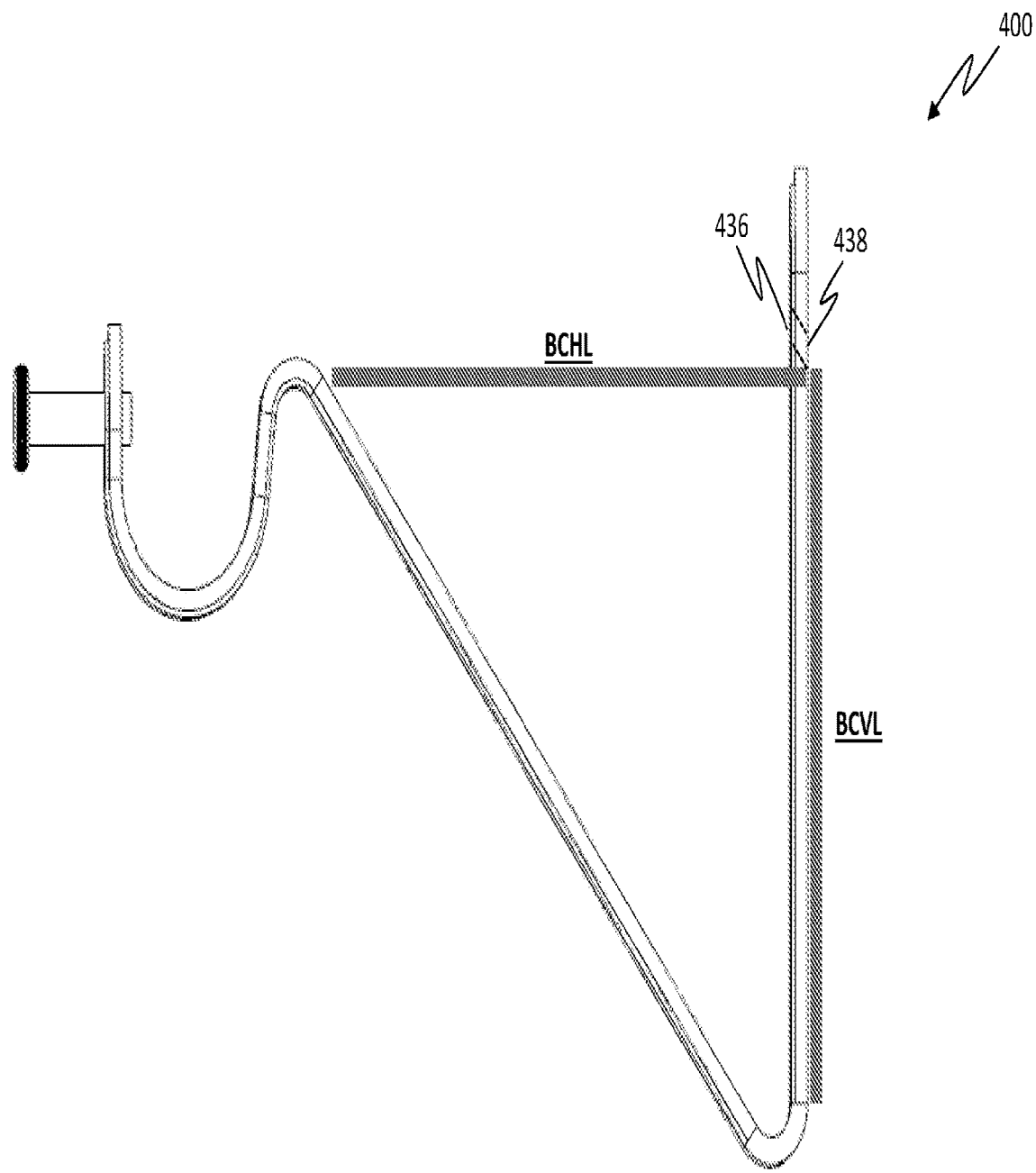
FIG. 10C is a side view of the rod bracket of FIG. 10A.

Referring to FIG. 10A, FIG. 10B and FIG. 10C, another embodiment of a rod bracket 400 is shown and includes a bracket base 402, a bracket rod arm 404 and a curtain rod cradle 406. The bracket base 402 includes a base top 408, a base bottom 410, base sides 412, a base front 414 and a base rear 416. The bracket base 402 defines a first base mount cavity 418 and a second base mount cavity 420 located proximate the base top 408. The first base mount cavity 418 and the second base mount cavity 420 are located such that if an imaginary axis line X were drawn down the center of the bracket base 402 from the base top 408 to the base bottom 410, the first base mount cavity 418 is located on one side of the imaginary axis line X and the second base mount cavity 420 is located equidistance on the other side of the imaginary axis line X. Moreover, it should be appreciated that the first base mount cavity 418 and second base mount cavity 420 are configured such that when the bracket base 402 is placed against a surface and a nail or screw is passed through the first base mount cavity 418 and the second base mount cavity 420, the nail or screw will enter the surface at an angle of about 45.degree. relative to a horizontal plane Y.

The bracket rod arm 404 includes an arm cradle end 422 and an arm base end 424, wherein arm cradle end 422 is connected to the curtain rod cradle 406 and wherein the arm base end 424 is connected to the base bottom 410 such that the bracket rod arm 404 is angled at an angle .PHI. relative to the bracket base 402, wherein .PHI. may range from about 15.degree. to about 60.degree. It should be appreciated that the curtain rod cradle 406 defines a rod cavity 426 and a cradle mounting cavity 428 having a cradle mounting cavity first opening 430 and a cradle mounting cavity second opening 432, wherein the cradle mounting cavity first opening 430 is communicated with the cradle mounting cavity second opening 432 via the cradle mounting cavity 428.

It should also be appreciated that the cradle mounting cavity second opening 432 is located to be within the rod cavity 426. Additionally, the cradle mounting cavity 428 includes a threaded cavity surface 434 such that when a rod mounting screw 250 having a threaded screw surface 252 is inserted into the cradle mounting cavity first opening 430 and rotated, the threaded screw surface 252 and the threaded cavity surface 434 engage each other. As such, the rod mounting screw 250 is securely contained within the cradle mounting cavity 428 such that a portion of the rod mounting screw 250 is protruding from the cradle mounting cavity second opening 432.

Referring to FIG. 10C, It should be appreciated that the first and second base mounting cavities 418, 420 include a front opening 436 located on the base front 414 and a rear opening 438 located on the base rear 416. Also, the bracket base 402 includes a bracket clearance vertical length BCVL which extends from the rear opening 438 to the base bottom 410 and the bracket rod arm 404 includes a bracket clearance horizontal length BCHL which extends between the arm cradle end 422 and the base rear 416. It is contemplated that in one embodiment there is a one-to-one (1:1) clearance ratio CR between the bracket clearance horizontal length BCHL and the bracket clearance vertical length BCVL and in other embodiments the CR may be greater or lesser than a one-to-one (1:1) ratio. It should be appreciated that the clearance ratio CR may be increased by increasing the bracket clearance vertical length BCVL which would advantageously allow for the rod bracket to support heavier loads than the 1:1 clearance ratio CR.

Figure 11:
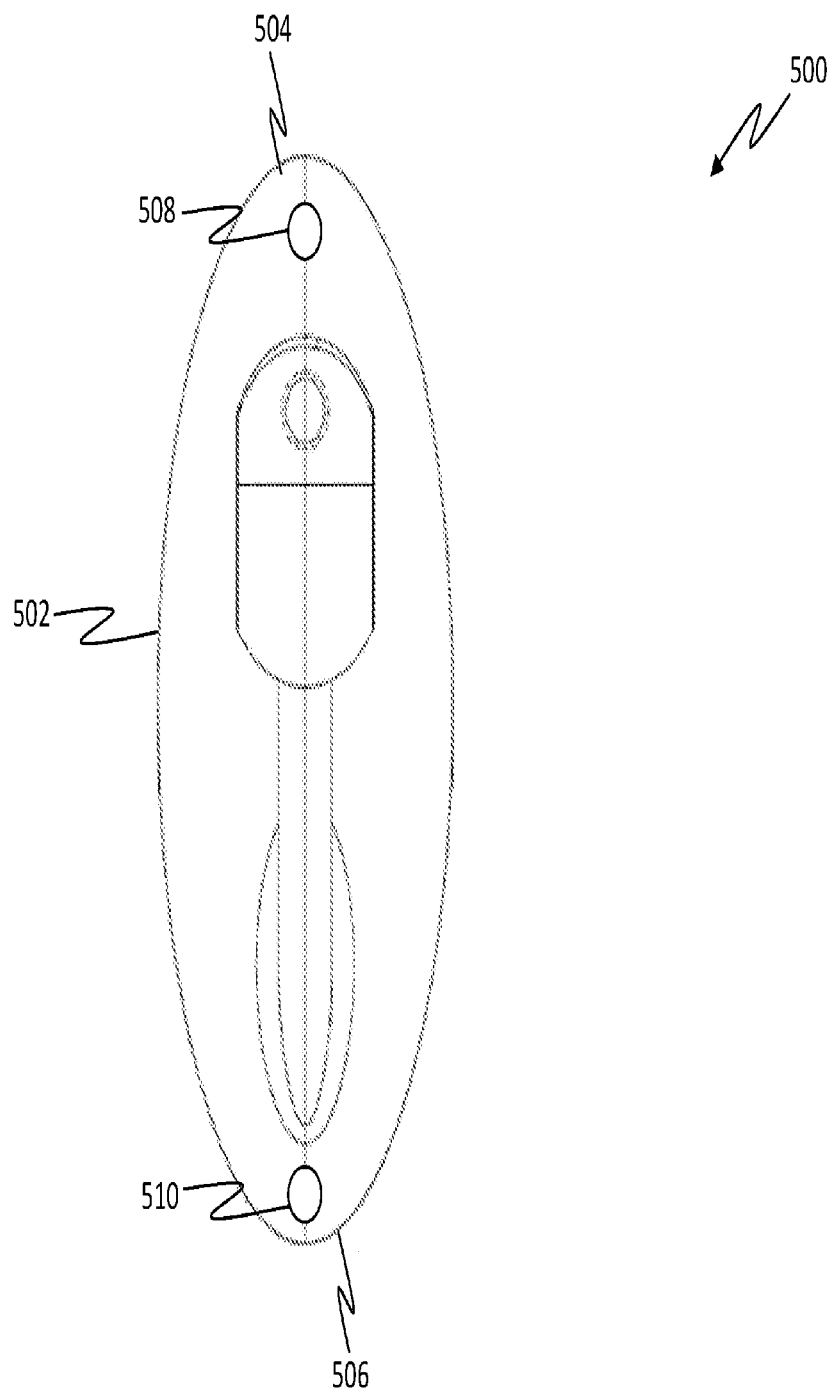
FIG. 11 is a front view of a rod bracket, in accordance with still yet another embodiment of the invention.
Figures 12A, 12B, 12C:
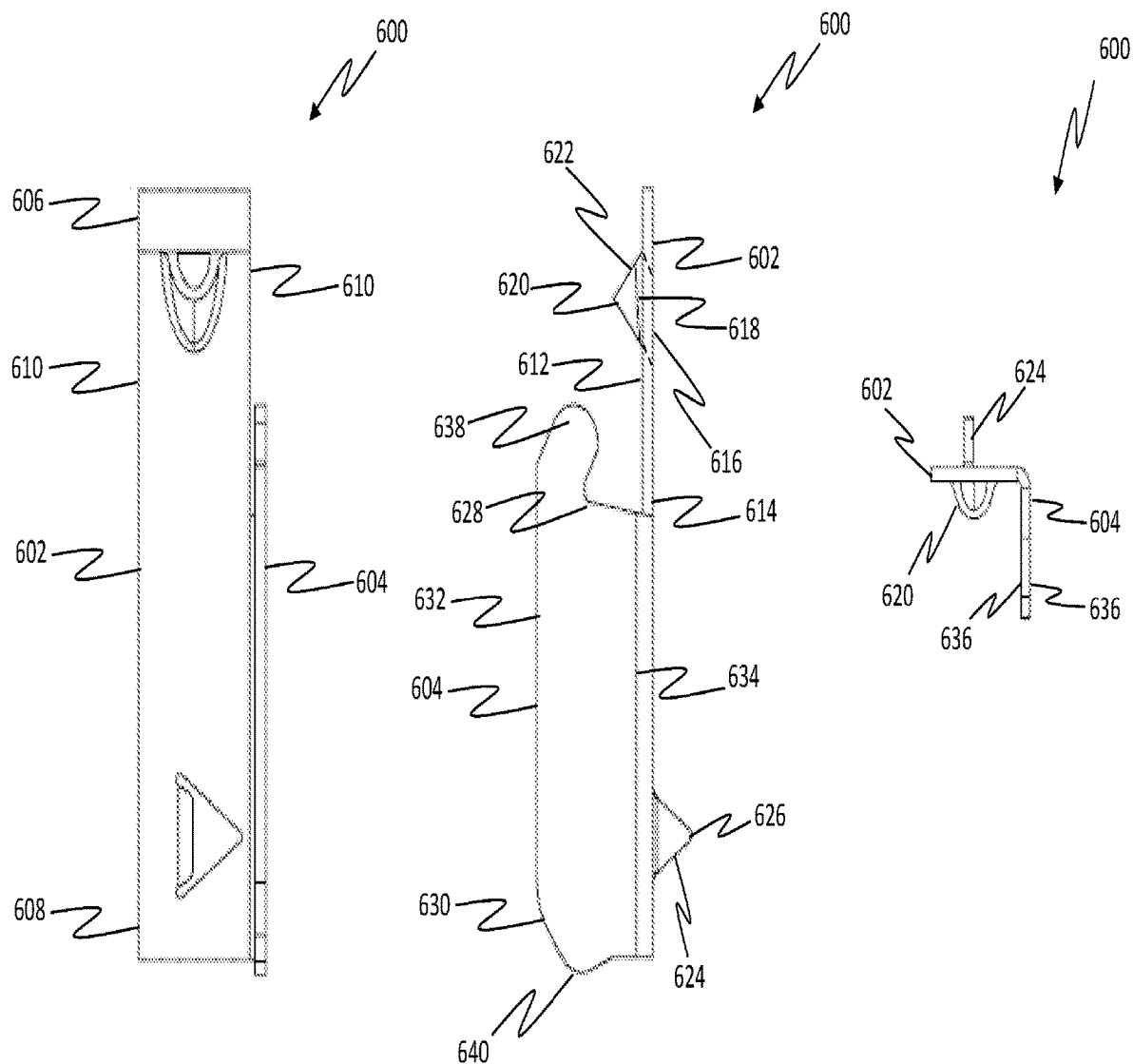
FIG. 12A is a front view of a rod bracket, in accordance with still yet another embodiment of the invention.
FIG. 12B is a side view of the rod bracket of FIG. 12A.
FIG. 12C is a top down view of the rod bracket of FIG. 12A.
Figure 12F:
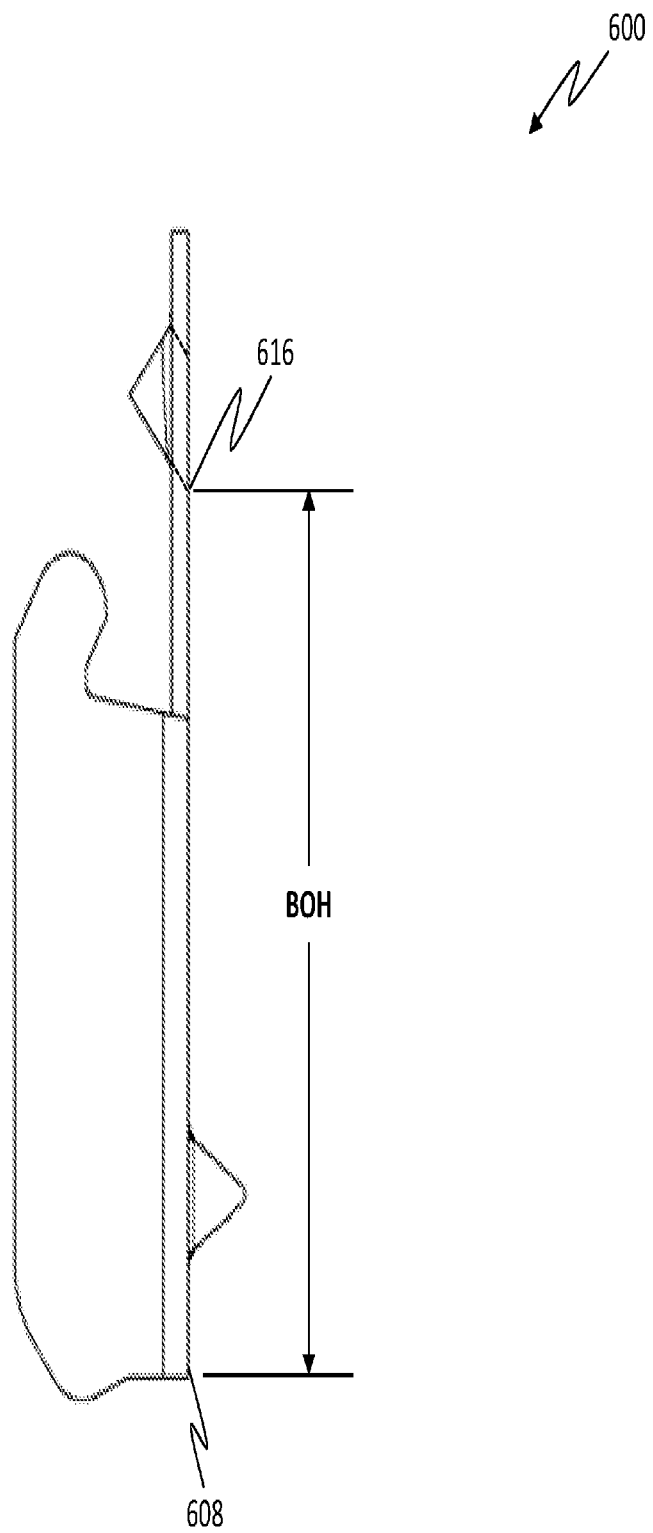
FIG. 12F is a side view of the rod bracket of FIG. 12A.

Referring to FIG. 11, still yet another embodiment of a rod bracket 500 is provided and includes a bracket base 502, wherein the bracket base 502 includes a base top 504 and a base bottom 506. The bracket base 502 defines a first base mount cavity 508 located in the center of the bracket base 502 proximate the base top 504 and a second base mount cavity 510 located in the center of the bracket base 502 proximate the base bottom 506.

Referring to FIG. 12A, FIG. 12B, FIG. 12C, FIG. 12D, FIG. 12E and FIG. 12F, still yet another embodiment of a rod bracket 600 is provided and includes a bracket base 602 and a bracket rod arm 604. The bracket base 602 includes a base top 606, a base bottom 608, base sides 610, a base front 612 and a base rear 614. The bracket base 602 includes a base rear opening 616, a base cavity 618 and a base mounting cradle 620 which defines a base front opening 622, wherein the base front opening 622 is communicated with the base rear opening 616 via the base cavity 618. It should be appreciated that the base front opening 622 and base cavity 618 are configured such that when the bracket base 602 is placed against a surface and a nail or screw is passed through the base front opening 622 and the base cavity 618, the nail or screw will enter the surface at an angle of about 45.degree. relative to a horizontal plane Y. In one embodiment, the mounting cradle 620 may be formed out of the bracket base 602 and acts to hold the nail or screw at an angle of about 45.degree. relative to a horizontal plane Y.

Furthermore, the bracket base 602 may further include a protrusion 624 (may include one or more protrusions 624) which extends out of and away from the base rear 614, wherein the protrusion 624 is located proximate the base bottom 608. The protrusion 624 (which may be a stabilizing spike) may include one or more sharp and/or pointed portion 626 which enters and engages the surface to which the rod bracket 600 is being mounted to provide stability. It should be appreciated that the protrusion 624 may be created from a portion of the bracket base 602 (such as by a 'punch out' or 'cut out') or the protrusion 624 may be connected to the base rear 614, via welding or other suitable connection device and/or method.

The bracket rod arm 604 includes a rod arm top 628, a rod arm bottom 630, a rod arm front 632, a rod arm rear 634 and rod arm sides 636. The rod arm rear 634 is connected to one of the base sides 610 such that the bracket rod arm 604 is configured to be at an angle 45 (which may be about 90.degree.) relative to the base front 612, wherein the bracket rod arm 604 extends away from the base front 612. The bracket rod arm 604 includes rod support structure 637 which includes an engagement structure 638 which protrudes from the rod arm top 628 and is angled back toward the bracket base 602 at an angle .mu., wherein .mu. may range from about 15.degree. to about 30.degree. relative to the rod arm front 632. Additionally, the rod arm bottom 630 includes a protrusion 640 which extends out of and downward from the rod arm bottom 630. It should be appreciated that in at least one embodiment, the bracket rod arm 604 is disposed to be proximate the rod arm bottom 630 and/or the engagement structure 638 is located lower on the bracket base 602 than the base mounting cradle 620.

Referring again to FIG. 12F, it should be appreciated that the bracket base 602 includes a Base Opening Height (BOH) which is defined as the distance between the base (i.e. bottom) of the base rear opening 616 and the flange on the bracket bottom 608. It should be appreciated that in at least one embodiment, BOH is at least about 1 inch or greater (with an error of about ± 0.15%). In other embodiments, BOH may be more or less than 1 inch. Referring to FIG. 12G, FIG. 12H and FIG. 12I, one embodiment of the rod bracket 600 is shown with dimensions.

In accordance with embodiments of the invention and referring to the figures, the rod bracket 100, 200, 300, 400, 500 operates as follows. Referring to the figures, the rod bracket 100, 200, 300, 400, 500 is placed on a flat surface, for example a wall, such that the base rear 116, 212 of a first rod bracket 100, 200, 300, 400, 500 is flat against the flat surface. A first nail is inserted into the first bracket base front opening 124, 220 and hit with a hammer (or other hard item) until the first nail traverses the first base mount cavity 120, 216 and exits out of the first bracket base rear opening 128, 224 and enters the flat surface. The first nail is driven into the flat surface until a small portion of the first nail is protruding out of the first bracket base front opening 124, 220. A second nail is then inserted into the second bracket base front opening 126, 222 and hit with a hammer (or other hard item) until the second nail traverses the second base mount cavity 122, 218 and exits out of the second bracket base rear opening 130, 226 and enters the flat surface. The second nail is driven into the flat surface until a small portion of the first nail is protruding out of the second bracket base front opening 126, 222. This is then repeated for a second rod bracket 100, 200, 300, 400, 500.

A curtain rod is then positioned within the rod cavity 138, 238 of the first and second rod brackets 100, 200, 300, 400, 500 and a rod mounting screw 148, 250 is inserted into the cradle mounting cavity first opening 141, 244 of the first rod bracket 100, 200, 300, 400, 500 and rotated. The threaded screw surface 152, 252 and the threaded cavity surface 150, 248 thereby engage each other securely containing the rod mounting screw 148, 250 within the cradle mounting cavity 142, 242 such that a portion of the rod mounting screw 148, 250 is protruding from the cradle mounting cavity second opening 143, 246. The portion of the rod mounting screw 148, 250 that is protruding from the cradle mounting cavity second opening 246 is pressing against the curtain rod that is contained within the rod cavity 138, 238, thereby securely containing the curtain rod within the rod cavity 138, 238. This is then repeated for the second rod bracket 100, 200, 300, 400, 500. It should be appreciated that in some embodiments, a resilient (i.e. spring biased) mounting pin may be used to hold the curtain rod within the rod cavity 138, 238. In such an embodiment, the mounting pin would be retracted until the curtain rod was located within the rod cavity 138, 238. When the curtain rod is located in the rod cavity 138, 238, the mounting pin would be released and the spring biasing would cause the mounting pin to compress against the curtain rod thereby securely containing the curtain rod within the rod cavity 138, 238. Moreover, in still yet another embodiment, protrusions may be located on the walls that define the rod cavity. Thus, when the curtain rod is located in the rod cavity 138, 238 the protrusions would frictionally contain the curtain rod within the rod cavity 138, 238.

It should be appreciated that the rod bracket 100, 200, 300, 400, 500, 600 may be configured to have one or more base mount cavities 118, 214, 314, 414, 514, 622 as desired. It is also contemplated that the rod bracket 100, 200, 300, 400, 500, 600 may be constructed from one piece or via multiple pieces connected together. Moreover, it should be appreciated that the rod bracket 100, 200, 300, 400, 500, 600 may be constructed from any material and/or combination of materials as desired suitable to the desired end purpose, such as for example, plastic, composite, metal, wood, etc. Additionally, it should be appreciated that the rod bracket 100, 200, 300, 400, 500, 600 may be sized as desired and as suitable to the desired end purpose.

It should be appreciated that while the invention has been described with reference to an exemplary embodiment, it will be understood by those skilled in the art that various changes, omissions and/or additions may be made and equivalents may be substituted for elements thereof without departing from the spirit and scope of the invention. Moreover, all of the information contained herein may be combined together (individually or wholly) or taken singly, as desired, to achieve varying embodiments of the invention and to add to the scope of the invention without limiting the invention to a particular embodiment. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims and/or information. Moreover, unless specifically stated any use of the terms first, second, etc. do not denote any order or importance, but rather the terms first, second, etc. are used to distinguish one element from another.

What is claimed is:

1. A method comprising:
    providing a first and a second one-piece rod bracket, each rod bracket comprising:
        a bracket base, wherein the bracket base defines a first bracket mounting cavity and a second bracket mounting cavity and includes a base front, a base rear, a base top and a base bottom, a bracket arm, wherein the bracket arm includes a first bracket arm end and a second bracket arm end and wherein the first bracket arm end is integrally fixed to the bracket base, and a curtain rod cradle integrally fixed to the second bracket arm end,
        wherein the bracket base further includes a first base side and a second base side and wherein the first bracket mounting cavity is located on the first base side and the second bracket mounting cavity is located on the second base side
    placing the first rod bracket on a flat surface such that the base rear is flat against the flat surface with the base top at a highest location on the flat surface such that the first and second base front openings are located higher on the flat surface than is the fixed arm;
    inserting a first fastener into the first base front opening of the first rod bracket;
    moving the first fastener until the first fastener traverses the first base mounting cavity of the first rod bracket and exits out of the first base rear opening of the first rod bracket and enters the flat surface until a small portion of the first fastener is protruding out of the first base front opening of the first rod bracket;
    inserting a second fastener into the second base front opening of the first rod bracket;
    moving the second fastener until the second fastener traverses the second base mounting cavity of the first rod bracket and exits out of the second base rear opening of the first rod bracket and enters the flat surface until a small portion of the second fastener it's protruding out of the second base front opening of the first rod bracket;
    inserting a third fastener into the first base front opening of the second rod bracket;
    moving the third fastener until the third fastener traverses the first base mounting cavity of the second rod bracket and exits out of the first base rear opening of the second rod bracket and enters the flat surface until a small portion of the third fastener is protruding out of the first base front opening of the second rod bracket;
    inserting a fourth fastener into the second base front opening of the second rod bracket; and
    moving the fourth fastener until the fourth fastener traverses the second base mounting cavity of the second rod bracket and exits out of the second base rear opening of the second rod bracket and enters the flat surface until a small portion of the fourth fastener is protruding out of the second base front opening of the second rod bracket.

2. The method of claim 1 further comprising:
    positioning a curtain rod within the rod cavity of the first and second rod brackets;
    inserting a rod mounting screw into a cradle cavity first opening of the first rod bracket; and
    rotating the rod mounting screw.

3. The method of claim 2 further comprising:
    inserting a rod mounting screw into a cradle cavity first opening of the second rod bracket; and
    rotating the rod mounting screw.

4. The method of claim 3 further comprising using a resilient mounting pin to hold the curtain rod within the rod cavity.

5. The method of claim 4 wherein the resilient mounting pin is a spring biased mounting pin.

6. The method of claim 3 further comprising protrusions located on walls that define the rod cavity.

7. The method of claim 1 wherein the first bracket mounting cavity and the second bracket mounting cavity are configured at an angle of about 45° relative to a horizontal plane.

8. The method of claim 1 wherein the first bracket mounting cavity and the second bracket mounting cavity communicate the base front with the base rear.

9. The method of claim 1 wherein the first bracket mounting cavity and the second bracket mounting cavity are located proximate the base top.

10. The method of claim 1 wherein the bracket arm extends substantially perpendicularly away from the base front and includes a bracket arm length.

11. The method of claim 10 wherein the bracket base defines a first bracket base front opening, a first bracket base rear opening, a second bracket base front opening and a second bracket base rear opening,
   wherein the first bracket base front opening is communicated with the first bracket base rear opening via the first bracket mounting cavity, and
   wherein the second bracket base front opening is communicated with the second bracket base rear opening via the second bracket mounting cavity.

12. The method of claim 1 wherein the curtain rod cradle defines a rod cavity for containing a curtain rod and includes a curtain rod securing device configured to engage with the curtain rod to securely contain the curtain rod within the rod cavity.

13. The method of claim 1 wherein the first bracket mounting cavity and the second bracket mounting cavity are configured to position nails into the surface at an angle of about 45° relative to a horizontal plane.

14. The method of claim 1 wherein the first bracket mounting cavity and the second bracket mounting cavity are configured to position screws into the surface at an angle of about 45° relative to a horizontal plane.

15. The method of claim 1 wherein the bracket base is substantially oval in shape.

16. The method of claim 1 wherein the bracket base is substantially rectangular in shape.

17. The method of claim 1 wherein the bracket base is substantially triangular in shape.

18. The method of claim 1 wherein the bracket base is substantially square in shape.

19. The method of claim 1 wherein the bracket arm is integral to and extending from the bracket base.

20. The method of claim 1 wherein the bracket arm has a length, and wherein the ratio between the bracket arm length and the distance between a first bracket base rear opening and the base bottom is at least 1:1, and wherein the ratio between the bracket arm length and the distance between a second bracket base rear opening and the base bottom is at least 1:1.

* * * * *